United States Patent [19]

Kojima et al.

[11] Patent Number: 5,384,175
[45] Date of Patent: Jan. 24, 1995

[54] MAGNETIC RECORDING DISC COMPRISING A NON-MAGNETIC UNDERLAYER AND A MAGNETIC LAYER COMPRISING FERROMAGNETIC PARTICLES AND A BINDER

[75] Inventors: Masaya Kojima; Kazuhiro Niitsuma; Satoru Hayakawa; Toshio Kawamata; Yasushi Endo, all of Kanagawa, Japan

[73] Assignee: Fuji Photo Film Co., Ltd., Kanagawa, Japan

[21] Appl. No.: 959,795

[22] Filed: Oct. 13, 1992

[30] Foreign Application Priority Data

Oct. 14, 1991 [JP] Japan .................................. 3-264778
Oct. 28, 1991 [JP] Japan .................................. 3-281665

[51] Int. Cl.⁶ ............................................. G11B 23/00
[52] U.S. Cl. ...................................... 428/64; 428/323; 428/336; 428/408; 428/694 BS; 428/900; 428/694 BP; 427/131
[58] Field of Search .................... 428/694, 900, 64, 65, 428/213, 328, 329, 323, 336, 408, 695, 694 BS, 694 BP; 427/131, 128

[56] References Cited

U.S. PATENT DOCUMENTS

| | | | |
|---|---|---|---|
| 4,587,157 | 5/1986 | Brock et al. | 428/216 |
| 4,666,769 | 5/1987 | Miyata et al. | 428/323 |
| 4,708,906 | 11/1987 | Sekiya et al. | 428/336 |
| 4,746,558 | 5/1988 | Shimozawa et al. | 428/141 |
| 4,874,633 | 10/1989 | Komatsu et al. | 427/48 |
| 4,963,433 | 10/1990 | Ogawa et al. | 428/323 |
| 4,975,322 | 12/1990 | Hideyama et al. | 428/323 |
| 5,075,167 | 12/1991 | Yamauchi et al. | 428/336 |
| 5,098,785 | 3/1992 | Yanagita et al. | 428/332 |

OTHER PUBLICATIONS

Patent Abstracts of Japan, vol. 11, No. 389 (P-648) Dec. 19, 1987 & JP-A-62 154 225 (Hitachi Maxell Ltd), Jul. 9, 1987.
Patent Abstracts of Japan, vol. 15, No. 296, (P-1231) Jul. 26, 1991 & JP-A-31 02 634 (Konica Corp) Apr. 30, 1991.

*Primary Examiner*—Stevan A. Resan
*Attorney, Agent, or Firm*—Sughrue, Mion, Zinn, Macpeak & Seas

[57] ABSTRACT

A novel magnetic recording disc is provided comprising, a nonmagnetic support having thereon a nonmagnetic layer comprising nonmagnetic particles and a binder resin, and a magnetic layer comprising ferromagnetic particles and a binder resin, in this order. The nonmagnetic particles in the nonmagnetic layer are partially or entirely electrically conductive particles, the thickness of the magnetic layer is in the range of 0.5 $\mu$m or less, and the orientation ratio of the ferromagnetic particles in the magnetic layer is 0.85 or more.

A novel process for preparing the magnetic recording disc is provided. Further, a novel process for recording and reproduction of a signal having a shortest recordable wavelength of 1.5 $\mu$m or less is provided, which utilizes the magnetic recording disc in conjunction with a magnetic head having a gap length ($\delta$) of 0.50 $\mu$m or less.

4 Claims, No Drawings

MAGNETIC RECORDING DISC COMPRISING A NON-MAGNETIC UNDERLAYER AND A MAGNETIC LAYER COMPRISING FERROMAGNETIC PARTICLES AND A BINDER

FIELD OF THE INVENTION

The present invention relates to a magnetic recording disc for high density recording, a process for preparing the magnetic recording disc, and a process for magnetic recording and reproduction thereon. More particularly, the present invention relates to a magnetic recording disc primarily adapted for the recording and reproduction of a signal having a shortest recordable wavelength of 1.5 μm or less, a process for the preparation thereof, and a process for magnetic recording and reproduction thereon.

BACKGROUND OF THE INVENTION

Magnetic recording media provide excellent advantages which cannot be obtained with other recording systems. Magnetic recording media enable repeated use of media, easily process signals in an electronic form, enable the construction of a system combined with a peripheral equipment, and can modify a signal. Thus, magnetic recording technique has been widely utilized in various fields, such as video equipment, audio equipment, computers and the like. To miniaturize equipment, satisfy the demand for improvement in the quality of recorded and reproduced signals, as well as the demand for prolongation of recordable time and the demand for increase in the recording capacity, it has been desired to further improve the recording density of recording media. For these purposes, improvements in magnetic materials have been made to improve the surface properties of the magnetic layer, the dispersibility of magnetic particles in the magnetic layer and the magnetic properties of the magnetic layer.

Floppy discs having a magnetic layer on a flexible nonmagnetic support, which are used as external recording media for microcomputers and personal computers, require a large capacity as high as 10M bytes or more to manage improved application software and the increase in the amount of data to be processed.

A recording system for high density code having a frequency component region 1.5 times wider than that of conventional codes, such as the RLL signal, has been proposed. Thus, the shortest recordable wavelength of signals to be recorded on these floppy discs approaches 3.0 μm or less, even 1.5 μm or less.

To enhance the recording density of the system, the gap length (δ) of magnetic heads has been reduced as well, nearing 0.5 μm or less.

To enable high density recording with a short recording wavelength, it is first necessary to enhance the coercive force of the magnetic layer. To this end, JP-A-58-122623 and JP-A-61-74137 (the term "JP-A" as used herein refers to a "published unexamined Japanese patent application") propose that a ferromagnetic metal powder in the form of ferromagnetic particles be incorporated in the magnetic layer on disc-shaped media.

JP-B-62-49656 and JP-A-60-50323 (the term "JP-B" as used herein refers to an "examined Japanese patent publication"), and U.S. Pat. Nos. 4,629,653, 4,666,770 and 4,543,198 disclose use of hexagonal system ferrites, such as barium ferrite, as ferromagnetic particles.

In a magnetic recording medium for computers, such as a floppy disc, overwriting of signals having different recording frequencies is indispensable. Conventional media were satisfactory if they allowed overwriting of two kinds of signals in a double-frequency relationship, i.e., if and 2f signals. However, the above mentioned RLL signal system requires not only the reduction of recordable wavelength, but also overwriting of a plurality of signals having a frequency ratio of 3:8.

If signals having a short recording wavelength and a great difference in recording frequency are used, overwriting of a signal with a shorter recording wavelength on a signal with a longer recording wavelength cannot be successfully performed when the magnetic properties of the magnetic layer are merely improved as disclosed in the above cited JP-A-58-122623 and JP-A-61-74137. In conventional magnetic media, when a signal with a shorter recording wavelength is overwritten on a previously recorded signal with a longer recording wavelength, the magnetic line of force does not reach deep in the magnetic layer, and thus cannot erase the previously recorded signal with a longer wavelength.

To overcome this difficulty, it is most effective to reduce the coercive force of the magnetic layer or reduce the thickness of the magnetic layer. However, the reduction in the coercive force of the magnetic layer causes a reduction in the resolution of recording signals or the reproduced output, making high density recording more difficult.

Another problem encountered with conventional magnetic recording discs is electrification of the media. The occurrence of dropouts resulting from the attachment of dust to the surface of the magnetic layer caused by the electrification of the media must be inhibited. Since these magnetic recording discs are adapted to record computer data in digital form, interruptions in recorded or reproduced signals due to dropout causes an increase in B.E.R. (bit error rate).

The shorter the recording wavelength of signals to be recorded in these magnetic recording discs, the greater the influence of dropout and the deterioration of running durability on the magnetic layer. Thus, this electrification problem is an important consideration in the design of a magnetic recording disc having a large capacity and a high recording density.

An ordinary method for inhibiting the electrification of media is to incorporate carbon black in the magnetic layer. However, even if the thickness of the magnetic layer is reduced, taking into account the problem caused by overwriting in recording of a short recording wavelength region, the amount of carbon black retained in the magnetic layer is limited. Further, to maintain superior the magnetic properties, the incorporation of carbon black in the magnetic layer is preferably avoided.

As another means of solving the electrification problem, a magnetic recording medium has been proposed comprising a nonmagnetic layer containing carbon black, or the like, provided interposed between a magnetic layer and a nonmagnetic support. This magnetic recording medium is disclosed in, e.g., JP-A-55-55432, JP-A-50-104003, JP-A-62-214513, JP-A-62-214514, JP-A-62-231417, and JP-A-63-31027, and U.S. Pat. No. 3,440,091. The magnetic recording medium having such a layer construction is proposed also to improve the surface properties or running durability of the magnetic layer.

However, the magnetic recording media disclosed in the prior art are not sufficiently thin for the recording wavelength of signals to be recorded in large capacity magnetic recording discs which are currently required.

When the thickness of the magnetic layer is reduced to improve the overwritability (i.e., the overwriting property) of magnetic recording discs, the amount of a lubricant which can be retained by the magnetic layer is reduced, deteriorating running durability. After repeated sliding movement with contact the magnetic layer and the magnetic head, lubricant runs short, causing a rise in the friction coefficient. As a result, the magnetic head will scrape the magnetic layer. If the magnetic layer contains too much lubricant, the physical properties thereof are deteriorated. Thus, the content of the lubricant in the magnetic layer is naturally limited.

If a ferromagnetic metal particle or hexagonal system ferrite in the form of ferromagnetic particles is incorporated in the magnetic layer to increase the capacity of magnetic recording discs, the magnetic layer tends to exhibit reduced running durability.

Further, the thinner the magnetic layer is, the more easily the magnetic layer can be peeled off from its support. Such peeling of the magnetic layer can be another cause of dropout. The peeling of the magnetic layer cannot be avoided even by providing a nonmagnetic layer between the magnetic layer and the nonmagnetic support.

As mentioned above, to provide a large capacity medium for a magnetic recording disc, such as floppy disc, the above problems must be considered. No means satisfying all these requirements have been proposed to date.

SUMMARY OF THE INVENTION

An object of the present invention is to provide a magnetic recording disc, primarily adapted for digital data recording, which exhibits excellent electromagnetic properties and running durability, and a process for the preparation thereof.

In particular, an object of the present invention is to provide a magnetic recording disc having excellent overwritability in high density recording applications, a high recording capacity, and a process for the preparation thereof.

A further object of the present invention is to provide a process for a digital data recording and reproduction which can provide large recording capacity and excellent overwritability.

These and other objects of the present invention will become more apparent from the following detailed description and examples.

These objects of the present invention are accomplished with a magnetic recording disc comprising, on a nonmagnetic support, a nonmagnetic layer comprising nonmagnetic particles and a binder resin, and a magnetic layer comprising ferromagnetic particles and a binder resin, in this order. The nonmagnetic particles in the nonmagnetic layer are partially or entirely electrically conductive particles, the thickness of the magnetic layer is 0.5 $\mu$m or less, and the orientation ratio of the ferromagnetic particles in the magnetic layer is in the range of 0.85 or more.

These objects of the present invention are further accomplished by a process for preparing a magnetic recording disc comprising, on a nonmagnetic support, a nonmagnetic layer mainly comprising nonmagnetic particles and a binder resin, and a magnetic layer mainly comprising ferromagnetic particles and a binder resin, in this order. This process comprises coating on a nonmagnetic support a nonmagnetic layer coating solution comprising nonmagnetic particles and a binder resin to form a nonmagnetic layer, coating on the coated nonmagnetic layer a magnetic layer coating solution having ferromagnetic particles dispersed in a binder resin solution while the coated nonmagnetic layer is wet, and then drying the coated nonmagnetic support to form a nonmagnetic layer and a magnetic layer on the nonmagnetic support in this order, wherein said nonmagnetic particles in said nonmagnetic layer are partially or entirely electrically conductive particles, the thickness of said magnetic layer is 0.5 $\mu$m or less, and the orientation ratio of said ferromagnetic particles in said magnetic layer is 0.85 or more.

These objects of the present invention are further accomplished by a process for magnetic recording and reproduction which comprises recording and reproduction of a signal having a shortest recordable wavelength of 1.5 $\mu$m or less using a magnetic head having a gap length ($\delta$) of 0.50 $\mu$m or less, and a magnetic recording disc comprising a nonmagnetic support having a nonmagnetic layer containing nonmagnetic particles which are partially or entirely electrically conductive particles, and a magnetic layer having a thickness of not less than 1.25 times the gap length ($\delta$), a coercive force of 1,400 Oe or more and an orientation ratio of 0.85 or more, formed on the nonmagnetic support in this order.

DETAILED DESCRIPTION OF THE INVENTION

In the magnetic recording disc of the present invention, the thickness of the magnetic layer is as extremely small, 0.5 $\mu$m or less. This thin magnetic layer causes no loss, even if the shortest recordable wavelength is 1.5 $\mu$m or less (preferably 1.0 $\mu$m or less), and provides excellent overwritability, which is indispensable for digital data recording. Further, when a ferromagnetic powder or hexagonal system ferrite is used as ferromagnetic particles to be incorporated in the magnetic layer, excellent electromagnetic properties can be obtained to provide a high output, even if the thickness of the magnetic layer is small. Moreover, by adjusting the orientation ratio of the ferromagnetic particles as high as 0.85 or more, the circumferential output on the magnetic recording disc can be uniform.

Further, by providing a nonmagnetic layer containing electrically conductive particles interposed between the magnetic layer and the nonmagnetic layer, a magnetic recording disc having excellent running durability, which is difficult to charge, causing little dropout, can be obtained.

The optimum thickness of the magnetic layer with respect to recording wavelength has heretofore been discussed from the standpoint of output loss. Taking into account the overwritability required by the present invention, which is important in the field of recording of digital data for use in computers, it was found that the optimum thickness of the magnetic layer has a strong relationship with the gap length ($\delta$) of the magnetic head.

When a magnetic head having a short gap length for short wavelength recording is used, if the thickness of the magnetic layer is 1.25 times or less the gap length of the magnetic head, a process for recording and reproduction which provides excellent overwritability can be obtained, even if the shortest recordable wavelength is as extremely small as 1.5 $\mu$m or less.

Even if recording is effected under high density conditions, e.g., recordable track width of 50 μm or less and track density of 14 track/mm or more, the process for the recording and reproduction of the present invention can be used to perform excellent recording and reproduction. This magnetic recording medium of the present invention can be used in the recording and reproduction process of the present invention to obtain excellent results.

In the preparation of the magnetic recording disc of the present invention, a process can be used which comprises coating on a nonmagnetic support a nonmagnetic layer coating solution mainly comprising nonmagnetic particles and a binder resin to form a nonmagnetic layer thereon, and then coating on said coated nonmagnetic layer a magnetic layer coating solution having ferromagnetic particles dispersed in a binder resin solution while said coated nonmagnetic layer is wet to provide a good adhesion of said magnetic layer to said nonmagnetic layer. This process produces a magnetic recording disc which has a magnetic layer with a thickness as small as 0.5 μm or less, but is not subject to peeling of the magnetic layer, and exhibits excellent running durability and high reliability.

Further, ferromagnetic metal particles or hexagonal system ferrites can be used as ferromagnetic particles to be incorporated in the above magnetic layer to provide a magnetic recording disc having a magnetic layer with excellent magnetic properties.

When ferromagnetic metal particles are incorporated in the magnetic layer in the magnetic recording disc of the present invention, the acicular ratio (i.e., long axis/short axis) of the ferromagnetic metal particles is preferably 3 to 12, and the coercive force of the magnetic layer is preferably 1,400 Oe or more. On the other hand, if hexagonal system ferrites are used, they preferably have an average particle size of 0.01 to 0.2 μm and a tabular ratio (i.e., tabular diameter/tabular thickness)Of 3 to 20 and the ferromagnetic particles thereof preferably exhibit a perpendicularly diamagnetically-corrected squareness ratio of 0.6 or more in the magnetic layer.

By so adjusting the ferromagnetic particles in the magnetic layer, a high density recording with excellent electromagnetic properties can be provided, and a magnetic layer with a high orientation ratio can be obtained.

At least 3 to 20% by weight of the nonmagnetic particles to be incorporated in the nonmagnetic layer are preferably carbon black particles. Carbon black particles with a small particle size having an average particle size of 40 mμm or less and having a DBP oil absorption of 300 ml/100 g or more, can smooth the surface of the uppermost magnetic layer and thus reduce the spacing loss with respect to the recording/reproduction head, giving a high reproduced output. Further, these carbon black particles can easily form a structure in the nonmagnetic layer, giving a reduced surface electrical resistance that reduces the occurrence of dropouts during running.

Further, by incorporating an aliphatic ester as a lubricant in the nonmagnetic layer in an amount of 3 to 20% by weight, the problem that the thin magnetic layer makes it impossible to increase the content of a lubricant in the magnetic layer can be solved. In conventional media, as the magnetic layer sides relative to the recording/reproduction head, the lubricant is gradually consumed and runs short, causing the magnetic layer to be scraped, or a rise in the friction of the magnetic layer with the recording/reproduction head, which can interrupt the operation of the system. However, in the above mentioned arrangement, the lubricant migrates from the nonmagnetic layer to the magnetic layer, which can invariably compensate for the consumption of the lubricant in the magnetic layer.

The thickness of the magnetic layer in the above mentioned magnetic recording disc of the present invention is normally 0.5 μm or less, preferably 0.45 μm or less.

When the thickness of the magnetic layer increases, the overwritability necessary for digital data recording is adversely affected. This tendency becomes remarkable particularly when the recordable wavelength is 1.5 μm or less.

The lower limit of the thickness of the magnetic layer is not specifically limited. However, if the magnetic layer is too thin, the reproduced output is reduced. Therefore, the lower limit of the thickness of the magnetic layer is important.

The sum of the thicknesses of the nonmagnetic layer and the magnetic layer formed on the nonmagnetic support may be 1 to 3.0 μm.

The orientation ratio of magnetic particles in the magnetic layer in the magnetic recording disc of the present invention is 0.85 or more, preferably 0.90 or more, more preferably 0.95 or more. The orientation ratio is obtained by dividing the minimum circumferential squareness ratio by the maximum circumferential squareness ratio on the disc medium. The greater the orientation ratio, the fewer fluctuations in the circumferential output occur, and the better the performance of the magnetic recording disc.

To adjust the orientation ratio to 0.85 or more, a random orientation process with a permanent magnet as disclosed in JP-B-3-41895, or a process which comprises application of an alternating magnetic field, as disclosed in JP-A-63-148417, JP-A-1-300427 and JP-A-1-300428; may be employed while the uppermost magnetic layer is undried. The acicular ratio of the ferromagnetic metal particles is preferably 12 or less, more preferably 10 or less, to adjust the orientation ratio to 0.85 or more.

The acicular ratio of the ferromagnetic metal particles to be used in the present invention is generally 3 to 12, preferably 4 to 11, more preferably 6 to 10. If the acicular ratio is too high, the orientation ratio cannot be increased as desired. On the contrary, if the acicular ratio is too low, the ferromagnetic metal particles are easily subjected to pressure demagnetization.

To provide a high recording density, if ferromagnetic metal particles are used as ferromagnetic particles, the coercive force of the magnetic layer is preferably adjusted to 1,400 Oe or more, more preferably 1,500 Oe or more.

By adjusting the coercive force of the magnetic layer to 1,400 Oe or more, the magnetic recording disc of the present invention can provide excellent output properties and electromagnetic properties and exhibit high reliability in the recording of digital data which has a low recording frequency, a high density and a short wavelength. Since the thickness of the magnetic layer is extremely small, 0.5 μm or less, the overwriting of short wavelength signals can be satisfactorily performed.

If the coercive force of the magnetic layer is too low, the resulting self-demagnetization effect causes a drop in the signal output. On the contrary, if the coercive force of the magnetic layer is too high, the dismagnetization by the magnetic recording head is made difficult.

Therefore, the coercive force of the magnetic layer is preferably not more than 2,500 Oe.

The residual magnetic flux density of the magnetic layer is preferably 1,100 G or more, more preferably 1,400 G or more.

The ferromagnetic particles to be incorporated in the magnetic layer in the magnetic recording disc of the present invention are not specifically limited. Various known ferromagnetic particles such as iron oxide particles, chromium oxide particles, cobalt-coated iron oxide particles, metal particles and hexagonal system ferrite particles can be used. To obtain optimum magnetic properties, ferromagnetic metal particles or hexagonal system ferrite particles are preferred. In particular, ferromagnetic metal particles comprising Fe, Ni or Co as main component (75% by weight or more) are preferably used to effectively accomplish the objects of the present invention.

The size of the magnetic particles to be used in the present invention is normally 25 to 80 m$^2$/g, preferably 35 to 60 m$^2$/g as calculated in terms of specific surface area according to the BET method. If the particle size falls less than 25 m$^2$/g, the noise level rises. On the contrary, if the particle size exceeds 80 m$^2$/g, the dispersion of the magnetic particles is difficult, making it impossible to provide a magnetic layer with good surface properties. As calculated in terms of crystallite size determined by X-ray diffraction analysis, the size of the magnetic particles to be used in the present invention is normally 100 to 450 Å, preferably 150 to 350 Å.

The above mentioned ferromagnetic metal particles to be used in the present invention may comprise a small amount of a hydroxide or oxide.

The ferromagnetic metal particles used in the present invention can be obtained by known preparation methods. Examples of these preparation methods include a method which comprises the reduction with a composite organic acid salt (mainly oxalate) and a reducing gas such as hydrogen, a method which comprises the reduction of iron oxide with a reducing gas such as hydrogen to obtain Fe or Fe—Co particles, a method which comprises the thermal decomposition of a metal carbonyl compound, a method which comprises adding a reducing agent such as sodium borohydride, hypophosphite and hydrazine to an aqueous solution of a ferromagnetic metal so that the ferromagnetic metal is reduced, and a method which comprises the evaporation of a metal in an inert gas under reduced pressure to obtain a finely divided metal powder.

Before use, the ferromagnetic metal particles thus-obtained may be subjected to any known gradual-oxidation treatment. Examples of such a gradual-oxidation treatment include a method which comprises dipping the ferromagnetic particles in an organic solvent, and then drying the material; a method which comprises dipping the ferromagnetic particles in an organic solvent, supplying an oxygen-containing gas into the system to form an oxide film thereon, and then drying the material; and a method which comprises adjusting the partial pressure of oxygen gas and inert gas in a system free of organic solvent to form an oxide film on the ferromagnetic particles. The ferromagnetic particles to be used preferably have a porosity as small as 20% by volume or less, more preferably 5% by volume or less.

As hexagonal system ferrite which can be used as ferromagnetic particles to be incorporated in the magnetic layer in the magnetic recording disc of the present invention, tabular ferromagnetic particles having an axis of easy magnetization in the perpendicular direction of the plane face thereof may typically be selected. Examples of the composition of hexagonal system ferrites useful in the present invention include substituted barium ferrite, substituted strontium ferrite, substituted lead ferrite, substituted calcium ferrite, cobalt-substituted barium ferrite and cobalt-substituted strontium ferrite. Specific examples of such compositions include magnetoplumbite type barium ferrite, magnetoplumbite type strontium ferrite, and magnetoplumbite type barium or strontium ferrites partially comprising a spinel phase. Particularly preferred among these ferrites are cobalt-substituted barium ferrites and cobalt-substituted strontium ferrites.

Further, materials obtained by incorporating elements such as Co—Ti, Co—Ti—Zr, Co—Ti—Zn, Ni—Ti—Zn and Ir—Zn in the above mentioned hexagonal system ferrites can be used.

The hexagonal system ferrite has normally a form of a hexagonal plate crystal. The particle size of the hexagonal system ferrite is represented by the width of the hexagonal plate crystal determined under an electron microscope. In the present invention, the particle size of the hexagonal system ferrite is preferably 0.01 to 0.2 μm, particularly preferably 0.03 to 0.1 μm. If the particle size of the hexagonal system ferrite is too large, the noise level rises, and the output in the high frequency region shows a drastic drop. If the particle size of the hexagonal system ferrite is too small, the saturation magnetization is reduced, lowering the output, and the dispersion of the particles is made difficult during the preparation of the magnetic coating solution.

The tabular ratio (tabular diameter/tabular thickness) of the hexagonal system ferrite is preferably 2 to 20, more preferably 3 to 10, most preferably 3 to 7.

The average thickness (tabular thickness) of the finely divided particles is preferably in the range of 0.001 to 0.2 μm, particularly preferably 0.003 to 0.05 μm. The finely divided hexagonal system ferrite particles preferably have a specific surface area ($S_{BET}$) of 25 to 70 m$^2$/g as determined by the BET method.

The saturation magnetization of the finely divided hexagonal system ferrite particles is preferably 50 emu/g or more. If the saturation magnetization falls less than 50 emu/g, sufficient reproduced output cannot be obtained, reducing high-density recording capacity.

In the case of recording of long wavelength signals, hexagonal system ferrites give a low output as compared with other magnetic particles. In the case of recording of short wavelength signals having a recording wavelength of 1.0 μm or less in a high frequency region, hexagonal system ferrites can be expected to give a higher output than other magnetic particles. Disc-shaped magnetic recording media such as magnetic recording disc are required to give a uniform output in the circumferential direction without fluctuations. To this end, the in-plane orientation ratio needs to be as high as possible. When hexagonal system ferrites are used as magnetic particles, an orientation ratio as high as 0.9 or more can be realized.

Further, if hexagonal system ferrites are used, when the residual magnetization/saturation magnetization ratio in the perpendicular direction, i.e., diamagnetically-corrected squareness ratio, of the magnetic layer is preferably adjusted to 0.6 or more, more preferably 0.65 or more, and the orientation ratio is adjusted to 0.9 or more, a magnetic recording disc which gives an unprecedentedly high output can be obtained. Thus, a magnetic recording disc having a large capacity can be provided.

The ferromagnetic particles to be incorporated in the magnetic recording disc of the present invention may comprise a small amount of other oxide series magnetic material such as chromium oxide, cobalt-coated iron oxide and $\gamma$-iron oxide partially blended therein.

The water content of the magnetic particles to be used in the present invention is preferably 0.01 to 2% by weight. The water content of the magnetic particles needs to be optimized depending on the kind of binder resin to be used in combination therewith.

The pH value of the magnetic particles to be used in the present invention is preferably optimized depending on the combination with the binder resin used. The pH value of the magnetic particles is preferably 4 to 12, more preferably 6 to 10. In particular, when the molecule of the binder resin contains a polar group, the pH value of the magnetic particles becomes more important.

The magnetic particles to be used in the present invention may be subjected to surface treatment with aluminum, silicon, phosphorus or an oxide thereof, if desired. The amount of the material to be used for this surface treatment is 0.1 to 10% based on the weight of the magnetic particles. When subjected to surface treatment, the magnetic particles exhibit an adsorption of lubricant such as aliphatic acid of 100 mg/m$^2$ or less, advantageously increasing the amount of free lubricant in the magnetic layer. Ferromagnetic particles may contain soluble inorganic ions such as sodium, calcium, iron, nickel and strontium ions. However, if the concentration of such an inorganic ion is not more than 500 ppm, it does not influence the properties of the ferromagnetic particles.

These ferromagnetic particles may contain atoms other than predetermined atoms, e.g., Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B.

The measurement of saturation magnetization and coercive force was carried out by a magnetometer "VSM-PI" (manufactured by Toei Kogyo K.K.) under a maximum magnetic field of 10 KOe. The measurement of specific surface area was carried out by means of Quantarsorb (manufactured by Quantarchrom Co., Ltd.). For measurement, the specimen was dehydrated at a temperature of 250° C. for 30 minutes in a nitrogen atmosphere. The measurement was effected by a BET single point method at a partial pressure of 0.30.

The nonmagnetic layer in the magnetic recording disc of the present invention is a layer comprising primarily nonmagnetic particles and a binder resin. However, a part of the nonmagnetic particles are preferably electrically conductive particles such as carbon black and graphite.

From the standpoint of antistat effect on the magnetic recording disc of the present invention, the proportion of electrically conductive particles in the nonmagnetic particles in the nonmagnetic layer is preferably 1% by weight or more, more preferably 2% by weight or more, most preferably 10% by weight or more. As the electrically conductive particles to be incorporated in the nonmagnetic layer there may be preferably used carbon black, such as furnace black for rubber, thermal black for rubber, carbon black for color, acetylene black and lamp black.

In particular, 3 to 20% by weight of the nonmagnetic particles in the nonmagnetic layer are preferably carbon black having an average particle size of 40 m$\mu$m or less and DBP oil absorption of preferably 300 ml/100 g or more, more preferably 300 to 1,500 ml/100 g. DBP oil absorption of carbon black is defined as the accumulation of the amount (ml) of dibutyl phthalate which has been gradually added to and kneaded with a carbon black powder until the dispersion of carbon black forms a solid mass. More preferably, the content of such black carbon is 8 to 19% by weight. If the content of such black carbon falls less than 3% by weight, the intrinsic surface resistivity of the nonmagnetic particles cannot be sufficiently reduced. On the contrary, if the content of such black carbon exceeds 20% by weight, the intrinsic surface resistivity of the nonmagnetic particles can be sufficiently reduced, but the surface of the magnetic layer cannot be made sufficiently smooth. The specific surface area of the nonmagnetic particles is preferably 5 to 1,500 m$^2$/g, more preferably 700 to 1,400 m$^2$/g. The particle size of the nonmagnetic particles is preferably 40 m$\mu$m or less, more preferably 5 to 40 m$\mu$m. The pH value of the nonmagnetic particles is preferably 2 to 10. The water content of the nonmagnetic particles is preferably 0.1 to 10%. The tap density (measured by a tap density instrument ("Tapdenser" manufactured by Seishin Enterprise Inc.) of the nonmagnetic particles is preferably 0.1 to 1 g/ml.

Specific examples of carbon black to be incorporated in the nonmagnetic layer include #3950B produced by Mitsubishi Carbon Co., Ltd.; Ketjen Black EC, Ketjen Black ECDJ-500 and Ketjen Black ECDJ-600 (produced by Lion Akzo Co., Ltd.); BLACKPEARLS 2000, 1300, 1000, 900, 800, 700, VULCAN and XC-72 (produced by Cabot Co., Ltd.); #80, #60, #55, #50 and #35 (produced by Asahi Carbon Co., Ltd.); #2400B, #2300, #900, #1000, #30, #40 and #10B (produced by Mitsubishi Chemical Corporation); and CONDUCTEX SC, RAVEN 150, 50, 40, 15 (produced by Columbia Carbon Co., Ltd.).

These carbon blacks may be surface-treated with a dispersant, grafted with a resin or partially graphitized before use.

These carbon blacks may be added to the magnetic coating in the form of a dispersion in a binder.

For carbon blacks which can be incorporated in the nonmagnetic layer of the magnetic recording disc of the present invention, reference can be made to *Handbook of Carbon Black*, Carbon Black Kyokai.

These electrically conductive particles, i.e., carbon black and the above mentioned nonmagnetic particles may be added to a dispersion in the form of a dispersion in a binder.

The thickness of the nonmagnetic layer is normally 0.5 to 10 $\mu$m, preferably 0.5 to 5 $\mu$m.

If the thickness of the nonmagnetic layer is too small, the electrification of the magnetic recording disc cannot be prevented. On the contrary, if the thickness of the nonmagnetic layer is too large, contact of the magnetic recording disc with the magnetic head cannot be maintained.

As the lubricant to be incorporated in the nonmagnetic layer in the magnetic recording disc of the present invention, various known liquid lubricants can be used. Particularly preferred among these liquid lubricants are aliphatic esters. Preferred examples of aliphatic esters which can be incorporated in the nonmagnetic layer include aliphatic esters made of a monobasic aliphatic acid having 12 to 20 carbon atoms and a monovalent alcohol having 3 to 12 carbon atoms.

Examples of alcohols as starting materials for aliphatic esters include monoalcohols such as ethanol, butanol, phenol, benzyl alcohol, 2-methylbutyl alcohol, 2-hexyldecyl alcohol, propylene glycol monobutyl ether, ethylene glycol monobutyl ether, dipropylene glycol monobutyl ether, diethylene glycol monobutyl ether, and s-butyl alcohol; and polyhydric alcohols such as ethylene glycol, diethylene glycol, neopentyl glycol, glycerin and sorbitan derivative.

Examples of aliphatic acids as starting materials for aliphatic esters include aliphatic acids such as acetic acid, propionic acid, octanic acid, 2-ethylhexanic acid, lauric acid, myristic acid, stearic acid, palmitic acid, behenic acid, arachic acid, oleic acid, linoleic acid, linolenic acid, elaidic acid and palmitoleinic acid, and mixture thereof.

Preferred examples of aliphatic esters include butyl stearate, s-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, mixture of butyl stearate and butyl palmitate, butoxyethyl stearate, 2-butoxy-1-propyl stearate, ester obtained by acylating dipropylene glycol monobutyl ether with stearic acid, diethylene glycol dipalmitate, diol obtained by acylating hexamethylenediol with myristic acid, and glycerin oleate.

In order to reduce the hydrolysis of aliphatic esters which often occurs when magnetic recording media are used under high humidity conditions, the isomerism (cis/trans) and branch position (branch/straight chain) of aliphatic acids and alcohols as starting materials should be properly selected.

Further preferred examples of aliphatic esters include one selected from butyl stearate and s-butyl stearate, butoxy ethyl stearate, and 2-butoxy-1-propyl stearate. These lubricants are advantageous because their molecular weight is such that they can easily migrate in the layer, giving a high feeding effect, and they are difficult to evaporate.

The amount of the above aliphatic esters to be incorporated into the layer is normally 3 to 20 parts by weight, preferably 5 to 15 parts by weight based on 100 parts by weight of all the nonmagnetic particles contained in the nonmagnetic layer. If this amount falls below 3 parts by weight, sufficient feeding effect cannot be obtained. On the contrary, if this amount exceeds 20 parts by weight, it feeds too much lubricant to the magnetic layer, causing excess lubricant to collect on the surface of the magnetic layer. This lubricant migration causes the magnetic layer to stick to the head in operation, and reduces the adhesion between the magnetic layer and the nonmagnetic layer.

Nonmagnetic particles, other than the above mentioned electrically conductive particles, to be used in the nonmagnetic layer in the magnetic recording disc of the present invention are not specifically limited. Specifically, α-alumina having an alpha conversion percentage of 90% or more, β-alumina, γ-alumina, silicon carbide, chromium oxide, cerium oxide, α-iron oxide, corundum, silicon nitride, titanium carbide, titanium oxide, silicon dioxide, boron nitride, zinc oxide, calcium carbonate, calcium sulfate, barium sulfate, etc., may be used singly or in combination. The particle size of these nonmagnetic particles is preferably 0.01 to 2 μm. If necessary, nonmagnetic particles having different particle sizes can be used in combination or nonmagnetic particles having a single particle size but with a wide distribution can be used to provide similar effects.

The tap density of these nonmagnetic particles is preferably 0.3 to 2 g/ml. The water content of these nonmagnetic particles is preferably 0.1 to 5%. The pH value of these nonmagnetic particles is preferably 2 to 11. The specific surface area of these nonmagnetic particles is preferably 1 to 30 $m^2/g$. The nonmagnetic particles to be used in the present invention may have any of acicular, spherical or die-like shapes. Specific examples of nonmagnetic particles to be used in the present invention include AKP-20, AKP-30, AKP-50 and HIT-50 (produced by Sumitomo Chemical Co., Ltd.), G5, G7 and S-1 (produced by Nippon Chemical Industrial Co., Ltd.), and TF-100, TF-120 and TF-140 (produced by Toda Kogyo K.K.).

By incorporating carbon black or the like in the magnetic layer, the intrinsic resistivity of the surface of the magnetic layer can be reduced, further inhibiting the electrification of the magnetic recording disc of the present invention and improving its running durability.

By incorporating carbon black or the like in the magnetic layer, the electrification of the magnetic recording disc of the present invention can further be inhibited and its running durability can be improved.

However, if electrically conductive particles such as carbon black are incorporated in the magnetic layer, the amount of the electrically conductive particles added cannot be so great as that in the nonmagnetic layer if magnetic properties are to be maintained. The optimum added amount of these electrically conductive particles should be limited to not more than 10 parts by weight based on 100 parts by weight of magnetic particles.

In the magnetic layer, carbon black inhibits the electrification of the magnetic layer, reduces the coefficient of friction of the magnetic layer with the magnetic head, provides a light shielding effect, and improves film strength. Different carbon blacks have different effects. Accordingly, the type, amount and combination of these carbon blacks can be properly altered from lower layer to upper layer, depending on the purpose, taking into account the above properties, such as particle size, oil absorption, electrical conductivity and pH. For example, carbon black having a high electrical conductivity can be used in the lower magnetic layer to inhibit the electrification of the magnetic layer, while carbon black having a large particle size can be used in the upper magnetic layer to reduce the coefficient of friction of the magnetic layer with the magnetic head.

As the binder resin to be incorporated in the magnetic layer and the nonmagnetic layer in the magnetic recording disc of the present invention, known thermoplastic resins, thermosetting resins, reactive resins or mixture thereof can be used. As the thermoplastic resins, those having a glass transition temperature of $-100°$ C. to $150°$ C., a number average molecular weight of 1,000 to 200,000, preferably 10,000 to 100,000, and a polymerization degree of about 50 to 1,000 can be used.

Examples of such thermoplastic resins include polymers or copolymers containing as constituent units vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal, vinyl ether, etc., polyurethane resins, and various rubber resins.

Examples of the above thermosetting resins or reactive resins include phenol resin, epoxy resin, polyurethane hardening resin, urea resin, melamine resin, alkyd resin, acrylic reactive resin, formaldehyde resin, silicone resin, epoxy-polyamide resin, mixture of polyester resin and isocyanate prepolymer, mixture of polyester polyol and polyisocyanate, and mixture of polyurethane and polyisocyanate.

These resins are further described in *Plastic Handbook*, Asakura Shoten. Further, known electron radiation hardening resins can be incorporated in either the upper layer or the lower layer. Examples of these resins and their preparation methods are further described in JP-A-62-256219. These resins can be used singly or in combination. Preferred examples of such a combination of resins include a combination of at least one selected from vinyl chloride resin, vinyl chloride-vinyl acetate resin, vinyl chloride-vinyl acetate-vinyl alcohol resin and vinyl chloride-vinyl acetate-maleic anhydride copolymer with a polyurethane resin, and a combination thereof with polyisocyanate.

Examples of the structure of polyurethane resins which can be used in the present invention include known structures such as polyester polyurethane, polyether polyurethane, polyether polyester polyurethane, polycarbonate polyurethane, polyester polycarbonate polyurethane and polycaprolactone polyurethane.

Of all these binders, those in which at least one polar group selected from COOM, $SO_3M$, $OSO_3M$, $P=O(OM)_2$, $OP=(OM)_2$ (in which M is a hydrogen atom or alkaline metal base), OH, $NR_2$, $NR_3$ (in which R is a hydrocarbon group), epoxy group, SH and CN has been introduced by copolymerization or addition reaction may be optionally used to obtain better dispersibility and durability. The amount of such a polar group in the binder is $1 \times 10^{-1}$ to $1 \times 10^{-8}$ mol/g, preferably $1 \times 10^{-2}$ to $1 \times 10^{-6}$ mol/g.

In particular, when ferromagnetic metal particles or hexagonal system ferrite particles are used as ferromagnetic particles to be incorporated in the magnetic layer, they are more difficult to disperse in the system than other ferromagnetic particles. Therefore, by using a binder resin containing the above mentioned polar resin, the dispersibility of these ferromagnetic particles can be effectively enhanced.

Specific examples of these binders to be used in the magnetic recording disc of the present invention include VAGH, VYHH, VMCH, VAGF, VAGD, VROH, VYES, VYNC, VMCC, XYHL, XYSG, PKHH, PKHJ, PKHC and PKFE (produced by Union Carbide Co., Ltd.); MPR-TA, MPR-TA5, MPR-TAL, MPR-TSN, MPR-TMF, MPR-TS and MPR-TM (produced by Nisshin Chemical Industry Co., Ltd.); 1000W, DX80, DX81, DX82 and DX83 (produced by Electro Chemical Industry Co., Ltd.); MR110, MR100 and 400X110A (produced by Nippon Zeon Co., Ltd.); Nippllan N2301, N2302 and N2304 (produced by Nippon Polyurethane Co., Ltd.); T-5105, T-R3080 and T-5201, Barnok D-400 and D-210-80, and Crisvon 6109 and 7209 (produced by Dainippon Ink And Chemicals, Inc.); U Vylon R8200, UR8300, RV530 and RV280 (produced by Toyobo Co., Ltd.); Daipheramine 4020, 5020, 5100, 5300, 9020, 9022 and 7020 (produced by Dainichi Seika Co., Ltd.); MX5004 (produced by Mitsubishi Chemical Corporation); Sunprene SP-150 (produced by Sanyo Chemical Industries Co., Ltd.); and Salan F310 and F210 (produced by Asahi Chemical Industry Co., Ltd.).

The content of the binder resin in the magnetic layer in the magnetic recording disc of the present invention is normally 5 to 50% by weight, preferably 10 to 30% by weight based on the weight of ferromagnetic particles. When a vinyl chloride resin is used, its content is preferably 5 to 30% by weight. When a polyurethane resin is used, its content is preferably 2 to 20% by weight. When a polyisocyanate is used, its content is preferably 2 to 20% by weight. These binder resins are preferably used in these amounts in combination.

In the present invention, when polyurethane is used, its glass transition temperature, breaking extension, breaking stress and yield point are preferably $-50°$ C. to $100°$ C., 100 to 2,000%, 0.05 to 10 kg/cm$^2$ and 0.05 to 10 kg/cm$^2$, respectively.

The magnetic recording disc of the present invention consists of two layers, i.e., the above magnetic layer and nonmagnetic layer. Accordingly, the amount of the binder, the amount of vinyl chloride resin, polyurethane resin, polyisocyanate or other resins to be contained in the binder, the molecular weight of resins constituting the magnetic layer, the amount of polar group, or the physical properties of the above resins can be altered from the upper layer to the lower layer.

Examples of polyisocyanates which can be used in the present invention include isocyanates such as tolylenediisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate, products of the reaction of these isocyanates with polyalcohols, and polyisocyanates produced by the condensation of isocyanates. Examples of the trade names of these commercially available isocyanates include Coronate L, Coronate HL, Coronate 2030, Coronate 2031, Millionate MR and Millionate MTL (produced by Nippon Polyurethane Co., Ltd.); Takenate D-102, Takenate D-110N, Takenate D-200 and Takenate D-202 (produced by Takeda Chemical Industries, Co., Ltd.); and Desmodur L, Desmodur IL, Desmodur N and Desmodur HL (produced by Sumitomo Bayer Co., Ltd.). These isocyanates may be used alone. Alternatively, by making the best use of the difference in hardening reactivity, two or more of these isocyanates can be used in combination in both the magnetic layer and nonmagnetic layer.

In the preparation of the magnetic recording disc of the present invention, the coating of the magnetic layer on the nonmagnetic layer is preferably carried out by the wet-on-wet coating method. The magnetic layer coating solution may be coated on the nonmagnetic layer coating solution coated on the nonmagnetic support while the nonmagnetic layer coating solution is wet. By employing this coating method, the adhesion of the magnetic layer to the nonmagnetic layer can be enhanced, giving a magnetic recording disc which is insusceptible to peeling of the magnetic layer, shows no dropouts and exhibits an excellent running durability, even if the magnetic layer is as thin as 0.5 μm.

In accordance with the conventional coating method which comprises coating a nonmagnetic coating solution on a support, drying the material to form a nonmagnetic layer thereon, and then coating a magnetic layer on the nonmagnetic layer, the resulting magnetic layer is extremely thin. Accordingly, in the case of the magnetic recording disc having an extremely thin magnetic layer as in the present invention, the adhesion between the nonmagnetic layer and the magnetic layer is not sufficient, making it difficult to provide an integrated structure of the two layers formed on the nonmagnetic support.

Specific examples of the above mentioned wet-on-wet coating method include the following methods:

(1) A method which comprises coating a lower layer by means of a gravure coating apparatus, roll coating apparatus, blade coating apparatus or extrusion coating apparatus commonly used for magnetic coating, and then coating an upper layer on the lower layer by means of a nonmagnetic support-pressure type extrusion coating apparatus disclosed in JP-B-1-46186, and JP-A-60-238179 and JP-A-2-265672 while the lower layer is wet;

(2) A method which comprises coating the lower layer coating solution and the upper layer coating solution almost simultaneously by means of a coating head having two coating solution passage slits as disclosed in JP-A-63-88080, JP-A-2-17971, and JP-A-2-265672; and (3) A method which comprises coating the lower layer coating solution and the upper layer coating solution almost simultaneously by means of an extrusion coating apparatus with a back-up roll as disclosed in JP-A-2-174965.

In order to inhibit the agglomeration of particles dispersed in the coating solution, a method as disclosed in JP-A-62-95174 and JP-A-1-236968 can be used to provide the coating solution inside the coating head with a shearing force.

In the wet-on-wet coating method, the viscoelastic property (thixotropy) of the coating solution is important. In other words, if the difference in the viscoelastic property between the upper layer coating solution and the lower layer coating solution is great, mixing of solutions occurs at the interface of the upper layer with the lower layer, causing deterioration of the surface properties, especially if the thickness of the upper magnetic layer is very small as in the present invention.

To render the viscoelastic property of the two coating solutions as close to each other as possible, it is effective to use the same particles in the upper layer and the lower layer. This approach is made possible in the present invention.

To meet the structural viscosity (i.e., a viscosity that particles dispersed are loosely bonded each other to form a structure linked as a whole) caused by the structure in which magnetic particles are formed by magnetism in the magnetic layer coating solution, particles which can easily produce a structural viscosity such as carbon black are preferably used as nonmagnetic particles to be incorporated in the lower nonmagnetic layer coating solution. To this end, it is effective to use carbon black having a high oil absorption and a small particle size. It is also effective to use nonmagnetic particles having a small particle size other than carbon black. For example, particles of titanium oxide, aluminum oxide or the like can be subjected to proper agglomeration to easily provide a coating solution having a structural viscosity of particles.

The magnetic layer in the magnetic recording disc of the present invention may comprise materials having various functions, such as lubricant and abrasive, incorporated therein. Besides these materials, antistatic agents, dispersants, plasticizers and mildew-proofing agents can be incorporated in the magnetic layer.

As the lubricant various known liquid lubricants and solid lubricants can be used. Examples of such lubricants include silicone oils such as dialkyl polysiloxane (containing an alkyl moiety having 1 to 5 carbon atoms), dialkoxy polysiloxane (containing an alkoxy moiety having 1 to 4 carbon atoms), monoalkyl monoalkoxy polysiloxane (containing an alkyl moiety having 1 to 5 carbon atoms and an alkoxy moiety having 1 to 4 carbon atoms), phenyl polysiloxane and fluoroalkyl polysiloxane (containing an alkyl moiety having 1 to 5 carbon atoms), finely divided particles of electrically conductive material such as graphite, powder of inorganic materials such as molybdenum disulfide and tungsten disulfide, finely divided particles of plastic such as polyethylene, polypropylene, polyethylene-vinyl chloride copolymer and polytetrafluoroethylene, $\alpha$-olefin polymers, unsaturated aliphatic hydrocarbons which are liquid at ordinary temperature (compound comprising n-olefin double bond at its terminal carbon, having about 20 carbon atoms), aliphatic esters made of a monobasic aliphatic acid having 12 to 20 carbon atoms and a monovalent alcohol having 3 to 12 carbon atoms, and fluorocarbons.

Particularly preferred among these lubricants are aliphatic esters.

Examples of alcohols as starting materials for aliphatic esters include monoalcohols such as ethanol, butanol, phenol, benzyl alcohol, 2-methyl butyl alcohol, 2-hexyldecyl alcohol, propylene glycol monobutyl ether, ethylene glycol monobutyl ether, dipropylene glycol monobutyl ether, diethylene glycol monobutyl ether and s-butyl alcohol, and polyhydric alcohols such as ethylene glycol, diethylene glycol, neopentyl glycol, glycerin and sorbitan derivatives.

Examples of aliphatic acids as starting materials for aliphatic esters include aliphatic carboxylic acids such as acetic acid, propionic acid, octanic acid, 2-ethylhexanic acid, lauric acid, myristic acid, stearic acid, palmitic acid, behenic acid, arachic acid, oleic acid, linoleic acid, linolenic acid, elaidic acid and palmitoleinic acid, and mixtures thereof.

Specific examples of aliphatic esters include butyl stearate, s-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, mixtures of butyl stearate and butyl palmitate, butoxyethyl stearate, 2-butoxy-1-propyl stearate, ester obtained by acylating dipropylene glycol monobutyl ether with stearic acid, diethylene glycol dipalmitate, diol obtained by acylating hexamethylenediol with myristic acid, and glycerin oleate.

To reduce the hydrolysis of aliphatic esters which often occurs when magnetic recording media are used under high humidity conditions, the isomerism (cis-/trans) and branch position (branch/straight chain) of aliphatic acids and alcohols as starting materials should be properly selected.

These lubricants can be used in an amount of 0.2 to 20 parts by weight based on 100 parts by weight of binder.

Further examples of lubricants which can be used in the present invention include silicone oil, graphite, molybdenum disulfide, boron nitride, fluorinated graphite., fluorine alcohol, polyolefin, polyglycol, alkylphosphoric ester and tungsten disulfide.

Examples of the trade names of these lubricants to be used in the present invention include NAA-102, NAA-415, NAA-312, NAA-180, NAA-160, NAA-174, NAA-175, NAA-222, NAA-34, NAA-35, NAA-171, NAA-122, NAA-142, NAA-160, NAA-173K, castor hardened aliphatic acid, NAA-42, NAA-44, Cation SA, Cation MA, Cation AB, Cation BB, Nymean L-201, Nymean L-202, Nymean S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monoguri MB, Nonion DS-60, Anon BF, Anon LG, butyl stearate, butyl laurate, and erucic acid (produced by Nippon Oils And Fats Co., Ltd.); oleic acid (produced by Kanto Chemical Co., Ltd.); FAL-205 and FAL-123 (produced by Takemoto Yushi Co., Ltd.); Enujerubu LO, Enujerubu IPM and Sansosyzer E4030 (produced by Shin Nihon Rika Co., Ltd.); TA-3, KF-96, KF-96L, KF-96H, KF-410, KF-420, KF-965, KF-54, KF-50, KF-56, KF-907, KF-851, X-22-819, X-22-822, KF-905, KF-700, KF-393, KF-857, KF-860, KF-865, X-22-980, KF-101, KF-102, KF-103, X-22-3710, X-22-3715, KF-910, and KF-3935 (produced by The Shin-Etsu Chemical Co., Ltd.); Armide P, Armide C, and Armoslip CP (produced by Lion Armor Co., Ltd.); Duomine TDO (produced by Lion Fat and Oil Co., Ltd.); BA-41G (produced by Nisshin Oil Mills, Ltd.); and Profan 2012E, New Pole PE61, Ionet MS-400, Ionet MO-200, Ionet DL-200, Ionet DS-300, Ionet DS-1000, and Ionet DO-200 (produced by Sanyo Chemical Co., Ltd.).

Specific examples of abrasives to be used in the present invention include α-alumina having an alpha conversion percentage of 90% or more, β-alumina, silicon carbide, chromium oxide, cerium oxide, α-iron oxide, corundum, artificial diamond, silicon nitride, silicon carbide-titanium carbide, titanium oxide, silicon dioxide, and boron nitride. In general, known materials having a Mohs' hardness of 6 or more are used alone or in combination. A composite material made of these abrasives (abrasives surface-treated with another abrasive) may be used. These abrasives may contain compounds or elements other than main component but exert similar effects so far as the content of the main component is not less than 90%.

The particle size of these abrasives is preferably in the range of 0.01 to 2 μm. If necessary, a plurality of abrasives having different particle sizes may be used in combination or a single abrasive having a wide particle size distribution may be used to provide similar effects. The tap density of these abrasives is preferably 0.3 to 2 g/ml. The water content of these abrasives is preferably 0.1 to 5%. The pH value of these abrasives is preferably 2 to 11. The specific surface area of these abrasives is preferably 1 to 30 m$^2$/g. The abrasives to be used in the present invention may have any of acicular, spherical or die-like shapes. The abrasives to be used in the present invention preferably may have edges partially on their shapes to provide high abrasion.

Specific examples of preferred abrasives include AKP-20A, KP-30, AKP-50 and HIT-50 (produced by Sumitomo Chemical Co., Ltd.); G5, G7, and S-1 (produced by Nippon Chemical Industrial Co., Ltd.); and 100ED and 140ED (produced by Toda Kogyo Co., Ltd.).

These abrasives may be incorporated in the magnetic coating in the form of a dispersion in a binder. The number of abrasive particles present on the surface and edge face of the magnetic layer in the magnetic recording medium of the present invention is preferably 5/100 μm$^2$ or more.

The amount of abrasives to be incorporated in the magnetic layer is normally 3 to 20 parts by weight based on 100 parts by weight of ferromagnetic particles.

If the added amount of abrasive is too small, the running durability of the magnetic recording disc is not sufficient. On the contrary, if the added amount of abrasive is too large, a drop in the output occurs.

The above mentioned additives to be incorporated in the magnetic layer are not necessarily 100% pure and may contain impurities such as isomers, unreacted matter, side reaction products, decomposition products and oxides, in addition to the main components. The content of these impurities is preferably 30% or less, more preferably 10% or less.

The lower nonmagnetic layer may contain additives similar to that contained in the magnetic layer. In the present invention wherein the extremely thin upper magnetic layer cannot sufficiently retain the lubricant, the lubricant can be contained in the lower nonmagnetic layer so that it can be properly fed to the magnetic layer, further improving the running properties of the magnetic recording disc of the present invention.

The additives to be used in the present invention may be entirely or partially added to the system at any step during the preparation of the magnetic coating solution. For example, these additives may be mixed with magnetic materials before kneading. Further, these additives may be added to the system during the step of kneading magnetic particles with a binder and a solvent. Alternatively, these additives may be added to the system during or after the dispersion step or immediately before the coating step.

Examples of organic solvents which can be used in the present invention include ketones such as acetone, methyl ethyl ketone, methyl isobutyl ketone, diisobutyl ketone, cyclohexanone, isophorone and tetrahydrofuran; alcohols such as methanol, ethanol, propanol, butanol, isobutyl alcohol, isopropyl alcohol and methyl cyclohexanol; esters such as methyl acetate, butyl acetate, isobutyl acetate, isopropyl acetate, ethyl butyrate and glycol acetate; glycol ethers such as glycol dimethyl ether, glycol monoethyl ether and dioxane; aromatic hydrocarbons such as benzene, toluene, xylene, cresol and chlorobenzene; chlorinated hydrocarbons such as methylene chloride, ethylene chloride, carbon tetrachloride, chloroform, ethylene chlorohydrin and dichlorobenzene; N,N-dimethylformamide; and hexane. These organic solvents may be used in any proportions. These organic solvents are not necessarily 100% pure and may contain impurities such as isomers, unreacted matters, side reaction products, decomposition products, oxides and water content besides main components. The content of these impurities is preferably 30% or less, more preferably 10% or less.

If necessary, the kind and amount of organic solvents to be used in the present invention may be altered from the magnetic layer to the lower layer.

For example, a highly volatile solvent may be used for the upper magnetic layer coating solution to improve the surface properties of the magnetic layer. Further, a solvent having a high surface tension (e.g., cyclohexanone, dioxane) can be used for the lower nonmagnetic layer coating solution to improve the coating stability. Moreover, a solvent having a high solubility parameter can be used for the lower nonmagnetic layer coating solution to enhance the packing density of the nonmagnetic layer. Of course, the present invention is not limited to these examples.

As the nonmagnetic support to be used in the present invention, any known film such as polyester (e.g., polyethylene terephthalate and polyethylene naphthalate), polyolefin, cellulose triacetate, polycarbonate, polyamide, polyimide, polyamide imide, and polysulfone can be used. These supports may be subjected to corona discharge treatment, plasma treatment, easy adhesion treatment, heating treatment, dust removing treatment, etc., prior to application of the magnetic and nonmagnetic layers.

The thickness of the nonmagnetic support in the magnetic recording disc of the present invention is normally 1 to 100 μm, preferably 20 to 85 μm.

An undercoating layer made of a polyester resin or the like may be interposed between the nonmagnetic support and the nonmagnetic layer coated thereon for the purpose of enhancing the adhesion therebetween. The thickness of the undercoating layer is normally 0.01 to 2 μm, preferably 0.05 to 0.5 μm.

The nonmagnetic layer and magnetic layer of the present invention may be provided on one or both sides of the nonmagnetic support.

To effectively accomplish the objects of the present invention, the nonmagnetic support to be used preferably exhibits a surface roughness of preferably 0.03 μm or less, more preferably 0.02 μm or less, most preferably 0.01 μm or less as calculated in terms of a centerline average surface roughness (Ra) according to JIS B 0601 (cutoff value: 0.25 mm). More preferably, these nonmagnetic supports not only have a small center-line average surface roughness but also are free of coarse protrusions. The roughness of the surface of these nonmagnetic supports can be freely controlled by the size and amount of fillers which are optionally added thereto. Examples of such fillers include oxides and carbonates of Ca, Si and Ti, and finely divided powders of acrylic organic resins. The nonmagnetic support to be used in the present invention preferably exhibits F-5 (i.e., the load at the 5% elongation) values of 5 to 50 kg/mm$^2$ in the web running direction and 3 to 30 kg/mm$^2$ in the web width direction. In general, F-5 value in the web running direction is higher than F-5 value in the web width direction. However, if desired, the strength in the web width direction of the nonmagnetic support may be larger than that in the web running direction.

The nonmagnetic support preferably exhibits a heat shrinkability in the web running and web width directions of preferably 3% or less, more preferably 1.5% or less at 100° C. for 30 minutes, and preferably 1% or less, more preferably 0.5% or less at 80° C. for 30 minutes. The breaking strength of the support is preferably in the range of 5 to 100 kg/mm$^2$ in both directions. The elastic modulus of the support is preferably in the range of 100 to 2 000 kg/mm$^2$, in both directions.

The process for the preparation of the magnetic coating for the magnetic layer in the magnetic recording disc of the present invention comprises at least a kneading step, a dispersion step. A mixing step may be optionally provided before or after these steps. These steps each may consist of two or more stages. The raw materials to be used in the present invention, e.g., magnetic particles, binder resins, nonmagnetic particles, carbon black, abrasives, antistatic agents, lubricants and solvent may be added to the system at any stage in any step. These raw materials each may be batchwise added to the system at two or more steps. For example, polyurethane may be batchwise charged in the system at the kneading step, dispersion step or a mixing step for viscosity adjustment after dispersion.

In order to accomplish the objects of the present invention, a known preparation technique can, of course, be used as a step. In the kneading step, an apparatus having a strong kneading power such as continuous kneader and pressure kneader can be used to enhance the residual magnetic flux density (Br) of the magnetic recording disc of the present invention. If a continuous kneader or pressure kneader is used, the magnetic particles are preferably kneaded with the whole or part (preferably 30% by weight or more of the total weight of all binder resins) in an amount of 15 to 500 parts by weight based on 100 parts by weight of magnetic particles. These kneading techniques are further described in JP-A-1-106388 and JP-A-1-79274. In the present invention, a simultaneous multilayer coating method as disclosed in JP-A-62-212933 can be used to give a higher efficiency in the preparation of the magnetic recording medium.

As calender roll to be used in the pressure molding treatment for smoothening the surface of the magnetic layer, a roll made of a heat-resistant plastic such as epoxy, polyimide, polyamide and polyimidoamide can be used. Further, metal rolls can be also used in the pressure molding treatment for smoothing the surface of the magnetic layer. The pressure molding temperature is preferably 70° C. or higher, more preferably 80° C. or higher. The linear pressure is preferably 200 kg/cm, more preferably 300 kg/cm or more.

The surface intrinsic resistivity of the magnetic layer in the magnetic recording medium of the present invention is preferably $1 \times 10^5$ to $5 \times 10^9$ Ω/sq. The magnetic layer preferably exhibits an elastic modulus of 100 to 2,000 kg/mm$^2$ at 0.5% elongation in both web coating direction and web width direction. The breaking strength of the magnetic layer is preferably 1 to 30 kg/cm$^2$. The elastic modulus of the magnetic recording medium is preferably 100 to 1,500 kg/mm$^2$ in both web coating direction and web width direction. The residual elongation of the magnetic recording medium is preferably 0.5% or less. The heat shrinkability of the magnetic recording medium at all temperatures of 100° C. or less is preferably 1% or less, more preferably 0.5% or less, particularly 0.1% or less.

The amount of the residual solvent in the magnetic layer is preferably 100 mg/m$^2$ or less, more preferably 10 mg/m$^2$ The residual solvent in the magnetic layer is preferably less than in the nonmagnetic layer.

The magnetic recording medium of the present invention preferably has voids (porosities) of preferably 30% by volume or less, more preferably 10% by volume or less in both the magnetic layer and nonmagnetic layer. The voids of the nonmagnetic layer are preferably greater than in the magnetic layer. However, if the voids of the nonmagnetic layer are 5% by volume or more, the voids of the nonmagnetic layer may be smaller than in the magnetic layer.

The magnetic recording medium of the present invention comprises a nonmagnetic layer and a magnetic layer. It can easily be presumed that the physical properties of the magnetic recording medium may be altered from the nonmagnetic layer to the magnetic layer. For example, the elastic modulus of the magnetic layer can be enhanced to improve the running durability thereof, while the elastic modulus of the nonmagnetic layer can be lower than that of the magnetic layer to improve the contact of the magnetic recording medium with the magnetic head.

The use of the magnetic recording disc of the present invention allows high density magnetic recording. In particular, the magnetic recording medium of the present invention is advantageous because the over-writability essential for digital data recording media for use in storage and reading of computer data is not deteriorated; and, the running durability is not reduced, even in high density recording with a shortest recording wavelength of 1.5 μm or less.

These advantages are provided by the above mentioned features created by the constitution of the magnetic disc of the present invention and its preparation method. These advantages are particularly attributed to the constitution and coating method of the layers formed on the nonmagnetic support.

Also, by adjusting the thickness of the magnetic layer to not more than 1.25 times the gap length (δ) of the magnetic head used in the recording and reproduction of digital data and providing a nonmagnetic layer containing electrically conductive particles under the magnetic layer, high density recording and reproduction of digital date can be effectively performed. The magnetic recording disc of the present invention preferably exhibits a coercive force of 1,400 Oe or more and an orientation ratio of 0.85 or more.

In other words, by adjusting the thickness of the magnetic layer to not more than 1.25 times the gap length (δ) of the magnetic head, an excellent overwritability can be maintained, even if the shortest recording wavelength is 1.5 μm or less. In particular, excellent properties can be expected in the recently proposed RLL recording system. Further, by using the constitution of the magnetic disc of the present invention, digital data recording can be performed free from deterioration of running durability due to the reduction of recording wavelength.

Of course, the combined use of the magnetic recording disc of the present invention with a magnetic head having a gap length 1/1.25 times or more the thickness of the magnetic layer makes possible excellent recording and reproduction.

The magnetic head used in the magnetic recording and reproduction process of the present invention is not specifically limited. As the magnetic head suitable for short wavelength recording, a metal-in-gap magnetic head may be preferably used. As materials for the metal gap, Sendust alloy or high magnetic permeability amorphous alloy may be preferably used.

The saturation magnetization of the gap material is generally 8,000 gauss or more, preferably 10,000 gauss or more.

The gap length of the magnetic head is generally 0.5 μm or less, preferably 0.45 μm or less.

The magnetic recording and reproduction process of the present invention becomes particularly effective when the shortest recordable wavelength, i.e., shortest recordable wavelength measured on the internal circumferential surface of the magnetic recording disc, is 1.5 μm or less in the case of constant circumferential speed. This effect becomes more remarkable when the shortest recordable wavelength is even as short as 1.0 μm or less.

The magnetic recording and reproduction process of the present invention is still effective if the track density is high. Thus, magnetic recording is possible with excellent peak shift separatability and little signal crosstalk.

Accordingly, recording and reproduction can be performed with excellent overwritability and running durability, even under conditions of recording track width of 50 μm or less and track density of 14 track/mm or more.

The present invention will be further described in the following examples, but the present invention should not be construed as being limited thereto.

EXAMPLE I-1

Preparation of Nonmagnetic Layer Coating Solution and Magnetic Layer Coating Solution

| | parts by weight |
|---|---|
| Nonmagnetic Layer Coating Solution A (containing electrically conductive particles) | |
| Nonmagnetic Particles | |
| Titanium oxide (TiO$_2$) ("TY50" produced by Ishihara Sangyo Kaisha Ltd.; average particle size: 0.34 μm; specific surface area by BET method: 5.9 m$^2$/g; pH: 5.9) | 80 |
| Carbon black (average primary particle size: 16 mμm; DBP oil absorption: 80 ml/100 g; pH: 8.0; specific surface area by BET method: 250 m$^2$/g; volatile component: 1.5% by weight) | 20 |
| Binder resin | |
| Vinyl chloride-vinyl acetate-vinyl alcohol copolymer (content of polar group —N(CH$_3$)$_3$ + Cl—: 5 × 10$^{-6}$ eq/g; monomer composition ratio: 86/13/1; polymerization degree: 400) | 14 |
| Polyester polyurethane resin (neopentyl glycol/caprolactone polyol/MDI: 0.9/2.6/1; content of —SO$_3$Na group: 1 × 10$^{-4}$ eq/g) | 5 |
| sec-Butyl stearate | 4 |
| Butoxy ethyl stearate | 2 |
| Butoxy ethyl palmitate | 2 |
| Oleic acid | 1 |
| Methyl ethyl ketone | 200 |
| Nonmagnetic Layer Coating Solution B (containing no electrically conductive particles) | |
| Nonmagnetic Particles | |
| Titanium oxide (TiO$_2$) ("TY50" produced by Ishihara Sangyo Kaisha Ltd.; average particle size: 0.34 μm; specific surface area by BET method: 5.9 m$^2$/g; pH: 5.9) | 80 |
| Binder Resin | |
| Vinyl chloride-vinyl acetate-vinyl alcohol copolymer (content of polar group —N(CH$_3$)$_3$ + Cl—: 5 × 10$^{-6}$ eq/g; monomer composition ratio: 86/13/1; polymerization degree: 400) | 14 |
| Polyester polyurethane resin (neopentyl glycol/caprolactone polyol/MDI: 0.9/2.6/1; content of —SO$_3$Na group: 1 × 10$^{-4}$ eq/g) | 5 |
| sec-Butyl stearate | 4 |
| Butoxy ethyl stearate | 2 |
| Butoxy ethyl palmitate | 2 |
| Oleic acid | 1 |
| Methyl ethyl ketone | 200 |
| Magnetic Layer Coating Solution A | |
| Ferromagnetic particles (composition ratio: Fe/Ni = 96/4 (atomic ratio); coercive force: 1,620 Oe; specific surface area by BET method: 50 m$^2$/g; crystallite size: 195 Å; particle size (average length in the long axis): 0.20 μm; acicular ratio: 10; saturation magnetization σs: 130 emu/g) | 100 |

-continued

| | parts by weight |
|---|---|
| Binder resin | |
| Vinyl chloride copolymer (content of SO3Na: $1 \times 10^{-4}$ eq/g; polymerization degree: 300) | 14 |
| Polyester polyurethane resin (neopentyl glycol/caprolactone polyol/MDI: 0.9/2.6/1; content of —SO3Na group: $1 \times 10^{-4}$ eq/g) | 5 |
| α-Alumina (average particle size: 0.3 μm) | 2 |
| Carbon black (particle size: 0.10 μm) | 0.5 |
| Isohexadecyl stearate | 6 |
| Oleic acid | 1 |
| Methyl ethyl ketone | 200 |
| Magnetic Layer Coating Solution B | |
| Ferromagnetic particles (composition ratio: Fe/Ni = 96/4 (atomic ratio); coercive force: 1,470 Oe; specific surface area by BET method: 50 m²/g; crystallite size: 195 Å; particle size (average length in the long axis): 0.20 μm; acicular ratio: 10; saturation magnetization σs: 130 emu/g) | 100 |
| Binder resin | |
| Vinyl chloride copolymer (content of SO3Na: $1 \times 10^{-4}$ eq/g; polymerization degree: 300) | 14 |
| Polyester polyurethane resin (neopentyl glycol/caprolactone polyol/MDI: 0.9/2.6/1; content of —SO3Na group: $1 \times 10^{-4}$ eq/g) | 5 |
| α-Alumina (average particle size: 0.3 μm) | 2 |
| Carbon black (particle size: 0.10 μm) | 0.5 |
| Isohexadecyl stearate | 6 |
| Oleic acid | 1 |
| Methyl ethyl ketone | 200 |
| Magnetic Layer Coating Solution C | |
| Ferromagnetic particles (composition ratio: Fe/Ni = 96/4 (atomic ratio); coercive force: 1,320 Oe; specific surface area by BET method: 50 m²/g; crystallite size: 195 Å; particle size (average length in the long axis): 0.20 μm; acicular ratio: 10; saturation magnetization σs: 130 emu/g) | 100 |
| Binder resin | |
| Vinyl chloride copolymer (content of SO3Na: $1 \times 10^{-4}$ eq/g; polymerization degree: 300) | 14 |
| Polyester polyurethane resin (neopentyl glycol/caprolactone polyol/MDI: 0.9/2.6/1; content of —SO3Na group: $1 \times 10^{-4}$ eq/g) | 5 |
| α-Alumina (average particle size: 0.3 μm) | 2 |
| Carbon black (particle size: 0.10 μm) | 0.5 |
| Isohexadecyl stearate | 6 |
| Oleic acid | 1 |
| Methyl ethyl ketone | 200 |

The particle size and crystallite size of the ferromagnetic particles were measured as follows:
   Particle size of magnetic particles: Average length in the long axis was determined under a transmission type electron microscope.
   Crystallite size: X-ray diffractometry was used to determine the spread of half value width of diffraction line on (4,4,0) plane and (2,2,0) plane of ferromagnetic particles.

The above nonmagnetic layer coating solutions A and B were kneaded with a continuous kneader. Similarly, the magnetic layer coating solutions A, B and C were each kneaded. These solutions were each subjected to kneading and dispersion by means of a sand mill. To the dispersion for the nonmagnetic layer and the dispersion for the magnetic layer was added polyisocyanate ("Coronate L", produced by Nippon Polyurethane Co., Ltd.) in an amount of 10 parts by weight and 12 parts by weight, respectively. To these dispersions was each added butyl acetate in an amount of 40 parts by weight with stirring and kneading. These dispersions were each filtered out through a filter having an average pore diameter of 1 μm to prepare a nonmagnetic layer coating solution A and magnetic layer coating solutions A, B and C.

Preparation of Magnetic Recording Disc Multilayered Coating by Wet-on-Wet Coating Method Using the above mentioned nonmagnetic layer coating solution and the above mentioned magnetic layer coating solutions combined as set forth in Table I-1, magnetic recording disc specimens I-1 to I-12 were prepared under the following conditions.

On a 62-μm thick polyethylene terephthalate support having a center-line average surface roughness (Ra) (cutoff value: 0.25 mm; JIS B 0601) of 0.01 μm was coated the above mentioned nonmagnetic layer coating solution and the magnetic layer coating solutions by a wet-on-wet simultaneous multilayered coating method in such an amount that the dry thickness of the nonmagnetic layer reached 2 μm and the dry thickness of the magnetic layers reached 2.7 μm, 0.7 μm, 0.5 μm and 0.3 μm, respectively. While these layers were wet, the material was passed through two alternating magnetic field generators so that the magnetic particles were subjected to random orientation. The frequency and strength of the two alternating magnetic fields used were 50 Hz and 200 Oe and 120 Hz and 1,300 Oe downward. After being dried, the material was then subjected to treatment by a 7-stage calendering machine (linear pressure: 300 kg/cm; temperature: 90° C.). The material was then punched to a 3.5 inch size piece. The material was then subjected to varnishing with an abrasive tape. From this material, a 3.5-inch floppy disc was prepared using predetermined mechanical parts for 3.5-inch floppy disc.

TABLE I-1

| Floppy Disc Specimen | Coating Solution Nonmagnetic Layer | Coating Solution Magnetic Layer | Thickness of Layer (μm) Nonmagnetic Layer | Thickness of Layer (μm) Magnetic Layer |
|---|---|---|---|---|
| Specimen I-1 | A | A | 2.0 | 2.7 |
| Specimen I-2 | A | B | 2.0 | 2.7 |
| Specimen I-3 | A | C | 2.0 | 2.7 |
| Specimen I-4 | A | A | 2.0 | 0.7 |
| Specimen I-5 | A | B | 2.0 | 0.7 |
| Specimen I-6 | A | C | 2.0 | 0.7 |
| Specimen I-7 | A | A | 2.0 | 0.5 |
| Specimen I-8 | A | B | 2.0 | 0.5 |
| Specimen I-9 | A | C | 2.0 | 0.5 |
| Specimen I-10 | B | A | 2.0 | 0.5 |
| Specimen I-11 | A | A | 2.0 | 0.3 |
| Specimen I-12 | B | A | 2.0 | 0.3 |
| Specimen I-14 | B | B | 2.0 | 0.5 |
| Specimen I-15 | A | B | 2.0 | 0.5 |

Multilayered Coating by Successive Coating Method

The above mentioned nonmagnetic layer coating solution A was coated on a support in such an amount that the dry thickness of the nonmagnetic layer reached 2 μm, and then dried. The material was then wound. On the nonmagnetic layer thus-formed was coated the above mentioned magnetic layer coating solution A in such an amount that the dry thickness of the magnetic layer reached 0.3 μm. While the magnetic layer was wet, the material was passed through two alternating magnetic field generators.

The frequency and strength of the two alternating magnetic fields used were 50 Hz and 200 Oe and 120 Hz and 1,300 Oe downward. After being dried, the material was then subjected to treatment by a 7-stage calendering machine (linear pressure: 300 kg/cm; temperature: 90° C.). The material was then punched to a 3.5 inch size piece. The material was then subjected to varnishing with an abrasive tape. From this material, a 3.5 inch floppy disc specimen I-13 was prepared using predetermined mechanical parts for 3.5 inch floppy disc.

The surface roughness (Ra) of the nonmagnetic support was determined by means of a three-dimensional surface roughness meter (produced by Kosaka Kenkyujo) at cutoff value of 0.25 mm in accordance with JIS B 0601.

Evaluation of Properties

The floppy disc specimens thus obtained were measured with respect to the following various properties:
Coercive Force and Orientation Ratio of Magnetic Layer Using a vibrating sample magnetometer (produced by Toei Kogyo Co., Ltd.), measurements were carried out at a maximum applied magnetic field of 5 KOe.
Thickness of Magnetic Layer A section was prepared from the floppy disc specimen. The section was then photographed under a scanning electron microscope ("S-700" produced by Hitachi, Ltd.). The thickness of the magnetic layer was determined from the photograph.
Reproduced Output Using a disc tester ("SK606B" produced by Tokyo Engineering K.K.) and two kinds of metal-in-gap heads having a gap length of 0.45 μm and 0.8 μm, respectively, recording was performed at a recording frequency of 625 KHz at the radial position 24.6 mm from the center. The output reproduced by the head amplifier was measured by an oscilloscope ("7633" produced by Tektronix Ink).

The reproduced output is represented relative to that of the medium A with the 0.45-μm gap head as 100.
Overwritability Using the above mentioned tester, a signal of 312.5 KHz was recorded on a specimen which had been demagnetized by an alternating magnetic field at the radial position 39.5 mm from the center. The output 01 (dB) of 312.5 KHz component was measured by a spectrum analyzer ("TR4171" produced by Advantest Corporation). A signal of 1 MHz was immediately overwritten on the same position. From the output 02 (dB) of 312.5 KHz component measured at the same position, the overwritability 02-01 (dB) was determined.
Running Durability Using a floppy disc drive FD1331 produced by Nippon Electric Co., Ltd., recording was made on all 240 tracks on the specimen at a recording frequency of 625 KHz. A thermal cycle test was then effected at the radial position 37.25 mm from the center in accordance with the following thermal cycle flowchart.

Under the thermal conditions, the running condition at 12 millionth pass was observed for the evaluation of running durability.
Thermal Cycle Flowchart (25° C.-50% RH; 1 hour)→heating for 2 hours→(60° C.-20% RH; 7 hours)→cooling for 2 hours→(25° C.-50% RH; 1 hour)→cooling for 2 hours→(5° C.-50% RH; 7 hours)→heating for 2 hours→(25° C.-50% RH; 1 hour)

Every 500,000th pass, the output of all the tracks and dropout were measured, and the external appearance of the medium was visually checked. When the output reached 60% of the initial value or 1 bit or more dropouts with an output of 45% or less of the initial value occur, this test was stopped.

The results of the evaluation of the magnetic properties of the magnetic layer are set forth in Table I-2. The results of the evaluation of the magnetic recording properties are set forth in Table I-3. The results of the running durability tests are set forth in Table I-4.

The comparison of coating method between the nonmagnetic layer and the magnetic layer is set forth in Table I-5.

TABLE I-2

| Floppy Disc Specimen | Coercive Force (Oe) | Orientation Ratio |
|---|---|---|
| Specimen I-1 | 1,600 | 0.97 |
| Specimen I-2 | 1,450 | 0.98 |
| Specimen I-3 | 1,300 | 0.97 |
| Specimen I-4 | 1,600 | 0.97 |
| Specimen I-5 | 1,450 | 0.98 |
| Specimen I-6 | 1,300 | 0.98 |
| Specimen I-7 | 1,600 | 0.97 |
| Specimen I-8 | 1,450 | 0.98 |
| Specimen I-9 | 1,300 | 0.98 |
| Specimen I-10 | 1,600 | 0.98 |
| Specimen I-11 | 1,600 | 0.98 |
| Specimen I-12 | 1,600 | 0.98 |
| Specimen I-14 | 1,450 | 0.98 |
| Specimen I-15 | 1,450 | 0.98 |

TABLE I-3

| Floppy Disc Specimen | Coercive Force (Oe) | Thickness of Magnetic Layer (μm) | Gap of Magnetic Head (μm) | Output (%) | Overwritability (dB) |
|---|---|---|---|---|---|
| I-1 | 1,600 | 2.7 | 0.45 | 100 | −24 |
| I-2 | 1,450 | 2.7 | 0.45 | 96 | −26 |
| I-3 | 1,300 | 2.7 | 0.45 | 81 | −28 |
| I-4 | 1,600 | 0.7 | 0.45 | 100 | −24 |
| I-5 | 1,450 | 0.7 | 0.45 | 96 | −26 |
| I-6 | 1,300 | 0.7 | 0.45 | 80 | −28 |
| I-7 | 1,600 | 0.5 | 0.45 | 99 | −33 |
| I-10 | 1,600 | 0.3 | 0.45 | 98 | −45 |
| I-11 | 1,600 | 0.3 | 0.80 | 60 | −48 |
| I-8 | 1,450 | 0.5 | 0.45 | 96 | −38 |
| I-9 | 1,300 | 0.5 | 0.45 | 81 | −37 |
| I-1 | 1,600 | 2.7 | 0.80 | 70 | −26 |
| I-2 | 1,450 | 2.7 | 0.80 | 65 | −28 |
| I-3 | 1,300 | 2.7 | 0.80 | 60 | −30 |
| I-7 | 1,600 | 0.5 | 0.80 | 62 | −38 |
| I-8 | 1,450 | 0.5 | 0.80 | 61 | −42 |
| I-9 | 1,300 | 0.5 | 0.80 | 57 | −45 |

TABLE I-4

| Floppy Disc Specimen | Coercive Force of Magnetic Layer (Oe) | Thickness of Magnetic Layer (μm) | Nonmagnetic Layer Coating Solution | Running Durability |
|---|---|---|---|---|
| I-7 | 1,600 | 0.5 | A | No defects at |

TABLE I-4-continued

| Floppy Disc Specimen | Coercive Force of Magnetic Layer (Oe) | Thickness of Magnetic Layer (μm) | Nonmagnetic Layer Coating Solution | Running Durability |
|---|---|---|---|---|
| I-10 | 1,300 | 0.5 | B | Magnetic layer peeled at 2 millionth pass |
| I-11 | 1,600 | 0.3 | A | No defects at 12 millionth pass |
| I-12 | 1,600 | 0.3 | B | Magnetic layer peeled at 1 millionth pass |
| I-14 | 1,450 | 0.5 | B | Magnetic layer peeled at 2 millionth pass |
| I-15 | 1,450 | 0.5 | A | No defects at 12 millionth pass |

TABLE I-5

| Floppy Disc Specimen | Coercive Force of Magnetic Layer (Oe) | Thickness of Magnetic Layer (μm) | Coating Method | Running Durability |
|---|---|---|---|---|
| I-11 | 1,600 | 0.3 | Wet-on-wet | No defects at 12 millionth pass |
| I-13 | 1,600 | 0.3 | Successive | Magnetic layer peeled at 3 millionth pass |

The specimens comprising a magnetic layer with a thickness of 0.5 μm or less, such as the magnetic recording disc of the present invention, exhibit a high output and excellent overwritability. It was also found that the magnetic head with a gap length of 0.80 μm cannot provide a high output as compared with the magnetic heat with a gap length of 0.45 μm. The magnetic recording disc comprising a magnetic layer having a thickness of 1.25 times or less the gap length of the magnetic head exhibited excellent overwritability as compared with those comprising a magnetic layer having a thickness of more than 1.25 times the gap length of the magnetic head.

It was further found that the floppy disc specimens I-10, I-12 and I-14, which are free of electrically conductive particles in the nonmagnetic layer, exhibit poor running durability.

It was still further found that the magnetic recording disc specimens comprising a nonmagnetic layer and a magnetic layer formed by a wet-on-wet simultaneous coating method exhibit excellent running durability.

EXAMPLE II-1

| | parts by weight |
|---|---|
| Nonmagnetic Layer Coating Solution | |
| Nonmagnetic Particles | |
| Titanium oxide (TiO$_2$) ("TY50" produced by Ishihara Sangyo Kaisha Ltd.; average particle size: 0.34 μm; specific surface area by BET method: 5.9 m$^2$/g; pH: 5.9) | 90 |
| Carbon black (average primary particle size: 16 mμm; DBP oil absorption: 80 ml/100 g; pH: 8.0; specific surface area by BET method: 250 m$^2$/g; volatile component: 1.5% by weight) | 10 |
| Binder resin | |
| Vinyl chloride-vinyl acetate-vinyl alcohol copolymer (content of polar group —N(CH$_3$)$_3$ + Cl—: 5 × 10$^{-6}$ eq/g; monomer composition ratio: 86/13/1; polymerization degree: 400) | 14 |
| Polyester polyurethane resin (neopentyl glycol/caprolactone polyol/MDI: 0.9/2.6/1; content of —SO$_3$Na group: 1 × 10$^{-4}$ eq/g) | 5 |
| Methyl ethyl ketone | 200 |
| Magnetic Layer Coating Solution | |
| Ferromagnetic particles (composition ratio: Fe/Ni = 96/4 (atomic ratio); coercive force: 1,620 Oe; specific surface area by BET method: 50 m$^2$/g; crystallite size: 195 Å; particle size (average length in the long axis): 0.20 μm; acicular ratio: 10; saturation magnetization σs: 130 emu/g) | 100 |
| Binder resin | |
| Vinyl chloride copolymer (content of SO$_3$Na: 1 × 10$^{-4}$ eq/g; polymerization degree: 300) | 14 |
| Polyester polyurethane resin (neopentyl glycol/caprolactone polyol/MDI: 0.9/2.6/1; content of —SO$_3$Na group: 1 × 10$^{-4}$ eq/g) | 5 |
| α-Alumina (average particle size: 0.3 μm) | 2 |
| Carbon black (particle size: 0.10 μm) | 0.5 |
| Isohexadecyl stearate | 6 |
| Oleic acid | 1 |
| Methyl ethyl ketone | 200 |

The particle size and crystallite size of the ferromagnetic particles were measured as follows:
Particle size of magnetic particles: Average length in the long axis was determined under a transmission type electron microscope.
Crystallite size: X-ray diffractometry was used to determine the spread of half value width of diffraction line on (4,4,0) plane and (2,2,0) plane of the ferromagnetic particles.

The above mentioned nonmagnetic layer coating solution and magnetic layer coating solution were each kneaded with a continuous kneader. These materials were each subjected to kneading and dispersion with a sand mill. To the dispersion for the nonmagnetic layer and the dispersion for the magnetic layer was added polyisocyanate ("Coronate L", produced by Nippon Polyurethane Co., Ltd.) in an amount of 10 parts by weight and 12 parts by weight, respectively. To these dispersions was each added butyl acetate in an amount of 40 parts by weight with stirring and kneading. These dispersions were each filtered out through a filter having an average pore diameter of 1 μm to prepare a nonmagnetic layer coating solution and a magnetic layer coating solution.

On a 62-μm thick polyethylene terephthalate support having a center-line average surface roughness (Ra) (cutoff value: 0.25 mm; JIS B 0601) of 0.01 μm and comprising a 0.1-μm thick undercoating layer made of a polyester polymer, was coated the above mentioned nonmagnetic layer coating solution and the magnetic layer coating solution by a wet-on-wet simultaneous multilayered coating method at a coating speed of 150 m/min, in such an amount that the dry thickness of the nonmagnetic layer reached 2 μm and the dry thickness of the magnetic layer reached 0.5 μm.

While the two layers were wet, the material was passed through two alternating magnetic field generators so that the magnetic particles were subjected to random orientation.

The frequency and strength of the two alternating magnetic fields used were 50 Hz and 200 Oe and 120 Hz and 1,300 Oe downward. After being dried, the material was then subjected to treatment by a 7-stage calendering machine (linear pressure: 300 kg/cm; temperature: 90° C.). The material was then punched to a 3.5 inch size piece. The material was then subjected to varnishing with an abrasive tape. From this material, a 3.5-inch floppy disc was prepared using predetermined mechanical parts for 3.5-inch floppy disc.

Another magnetic layer was formed on the other side of the nonmagnetic support under the same conditions. Thus, a magnetic recording disc comprising a magnetic layer on both sides of a nonmagnetic support was obtained.

EXAMPLE II-2

A 3.5-inch floppy disc specimen was prepared in the same manner as in Example II-1 except that the composition of the magnetic layer coating solution and the orientation conditions of the ferromagnetic particles were altered as follows:

|  | parts by weight |
|---|---|
| Ferromagnetic particles | 100 |
| (ferromagnetic hexagonal system barium ferrite particles (i.e., tabular particles); coercive force: 1,400 Oe; specific surface area by BET method: 45 m$^2$/g; particle size (tabular diameter): 0.06 μm; tabular ratio: 5.2; saturation magnetization σs: 65 emu/g) | |
| Binder resin | |
| Vinyl chloride copolymer | 8 |
| (content of SO$_3$Na: 1 × 10$^{-4}$ eq/g; polymerization degree: 300) | |
| Polyester polyurethane resin | 4.5 |
| (neopentyl glycol/caprolactone polyol/MDI: 0.9/2.6/1; content of —SO$_3$Na group: 1 × 10$^{-4}$ eq/g) | |
| α-Alumina | 2 |
| (average particle size: 0.3 μm) | |
| Carbon black | 0.5 |
| (particle size: 0.10 μm) | |
| Isohexadecyl stearate | 6 |
| Oleic acid | 1 |
| Methyl ethyl ketone | 200 |

Orientation Conditions

While the two layers were wet, the material was passed through the gap between two permanent magnets which had been installed perpendicularly such that a magnetic field of 2,500 G was created on the coated surface, so that perpendicular orientation was effected.

EXAMPLE II-3

A 3.5-inch floppy disc specimen was prepared in the same manner as in Example II-1 except that the composition of the nonmagnetic layer coating solution was altered by including a lubricant as follows:

| Nonmagnetic Layer Coating Solution | parts by weight |
|---|---|
| Nonmagnetic Particles | |
| Titanium oxide (TiO$_2$) | 90 |
| ("TY50" produced by Ishihara Sangyo Kaisha Ltd.; average particle size: 0.34 μm; specific surface area by BET method: 5.9 m$^2$/g; pH: 5.9) | |
| Carbon black | 10 |
| (average primary particle size: 16 mμm; DBP oil absorption: 80 ml/100 g; pH: 8.0; specific surface area by BET method: 250 m$^2$/g; volatile component: 1.5% by weight) | |
| Binder resin | |
| Vinyl chloride-vinyl acetate-vinyl alcohol copolymer | 14 |
| (content of polar group —N(CH$_3$)$_3$ + Cl—: 5 × 10$^{-6}$ eq/g; monomer composition ratio: 86/13/1; polymerization degree: 400) | |
| Polyester polyurethane resin | 5 |
| (neopentyl glycol/caprolactone polyol/MDI: 0.9/2.6/1; content of —SO$_3$Na group: 1 × 10$^{-4}$ eq/g) | |
| sec-Butyl stearate | 4 |
| 2-Butoxy-1-ethyl stearate | 2 |
| 2-Butoxy-1-ethyl palmitate | 2 |
| Oleic acid | 1 |
| Methyl ethyl ketone | 200 |

EXAMPLE II-4

A 3.5-inch floppy disc specimen was prepared in the same manner as in Example II-2 except that the composition of the nonmagnetic layer coating solution was altered to the same composition as used in Example II-3.

EXAMPLE II-5

A 3.5-inch floppy disc specimen was prepared in the same manner as in Example II-3 except that the dry thickness of the magnetic layer was 0.2 μm.

EXAMPLE II-6

A 3.5-inch floppy disc specimen was prepared in the same manner as in Example II-4 except that the dry thickness of the magnetic layer was 0.2 μm.

EXAMPLE II-7

A 3.5-inch floppy disc specimen was prepared in the same manner as in Example II-3 except that the composition of the nonmagnetic layer coating solution was altered by changing the nonmagnetic particles as follows:

| Nonmagnetic Layer Coating Solution | parts by weight |
|---|---|
| Nonmagnetic Particles | |
| α-Fe$_2$O$_3$ | 90 |
| ("TF100" produced by Toda Kogyo Co., Ltd.; average particle size: 0.1 μm; specific surface area by BET method: 11 m$^2$/g; pH: 5.6) | |
| Carbon black | 10 |
| (Ketjen Black EC (produced by Lion Akzo Co., Ltd.); average primary particle size: 20 to 30 mμm; DBP oil absorption: 340 ml/100 g; specific surface area by BET method: 950 m$^2$/g; volatile component: 1.5% by weight) | |
| Binder resin | |
| Vinyl chloride-vinyl acetate-vinyl alcohol copolymer | 14 |
| (content of polar group —N(CH$_3$)$_3$ + Cl—: 5 × 10$^{-6}$ eq/g; monomer composition ratio: 86/13/1; polymerization degree: 400) | |
| Polyester polyurethane resin | 5 |
| (neopentyl glycol/caprolactone | |

| Nonmagnetic Layer Coating Solution | parts by weight |
|---|---|
| polyol/MDI: 0.9/2.6/1; content of —SO$_3$Na group: $1 \times 10^{-4}$ eq/g) | |
| sec-Butyl stearate | 4 |
| 2-Butoxy-1-ethyl stearate | 2 |
| 2-Butoxy-1-ethyl palmitate | 2 |
| Oleic acid | 1 |
| Methyl ethyl ketone | 200 |

EXAMPLE II-8

A 3.5-inch floppy disc specimen was prepared in the same manner as in Example II-4 except that the composition of the nonmagnetic layer coating solution was altered to the same composition as used in Example II-7.

EXAMPLE II-9

A 3.5-inch floppy disc specimen was prepared in the same manner as in Example II-3 except that the composition of the nonmagnetic layer coating solution was altered by changing the nonmagnetic particles as follows:

| Nonmagnetic Layer Coating Solution | parts by weight |
|---|---|
| Nonmagnetic Particles | |
| α-Al$_2$O$_3$ | 90 |
| ("HPSX-DBM" produced by Reynolds International Inc.; average particle size: 0.1 μm; specific surface area by BET method: 10.3 m$^2$/g; pH: 9.1) | |
| Carbon black | 10 |
| (Ketjen Black EC (produced by Lion Akzo Co., Ltd.); average primary particle size: 20 to 30 mμm; DBP oil absorption: 340 ml/100 g; specific surface area by BET method: 950 m$^2$/g; volatile component: 1.5% by weight) | |
| Binder resin | |
| Vinyl chloride-vinyl acetate-vinyl alcohol copolymer | 14 |
| (content of polar group —N(CH$_3$)$_3$ + Cl—: $5 \times 10^{-6}$ eq/g; monomer composition ratio: 86/13/1; polymerization degree: 400) | |
| Polyester polyurethane resin | 5 |
| (neopentyl glycol/caprolactone polyol/MDI: 0.9/2.6/1; content of —SO$_3$Na group: $1 \times 10^{-4}$ eq/g) | |
| sec-Butyl stearate | 4 |
| 2-Butoxy-1-ethyl stearate | 2 |
| 2-Butoxy-1-ethyl palmitate | 2 |
| Oleic acid | 1 |
| Methyl ethyl ketone | 200 |

EXAMPLE II-10

A 3.5-inch floppy disc specimen was prepared in the same manner as in Example II-4 except that the composition of the nonmagnetic layer coating solution was altered to the same composition as used in Example II-9.

EXAMPLE II-11

A 3.5-inch floppy disc specimen was prepared in the same manner as in Example II-4 except that the composition of the magnetic layer coating solution was altered by changing only the ferromagnetic particles and the orientation conditions of the ferromagnetic particles were altered as follows:

| | parts by weight |
|---|---|
| Ferromagnetic particles | 100 |
| (ferromagnetic hexagonal system barium ferrite particles (i.e., tabular particles); coercive force: 1,380 Oe; specific surface area by BET method: 50 m$^2$/g; particle size (tabular diameter): 0.045 μm; tabular ratio: 9.8; saturation magnetization σs: 65 emu/g) | |
| Binder resin | |
| Vinyl chloride copolymer | 8 |
| (content of SO$_3$Na: $1 \times 10^{-4}$ eq/g; polymerization degree: 300) | |
| Polyester polyurethane resin | 4.5 |
| (neopentyl glycol/caprolactone polyol/MDI: 0.9/2.6/1; content of —SO$_3$Na group: $1 \times 10^{-4}$ eq/g) | |
| α-Alumina | 2 |
| (average particle size: 0.3 μm) | |
| Carbon black | 0.5 |
| (particle size: 0.10 μm) | |
| Isohexadecyl stearate | 6 |
| Oleic acid | 1 |
| Methyl ethyl ketone | 200 |

Orientation Conditions

No perpendicular orientation was effected after the coating of nonmagnetic layer coating solution and the magnetic layer coating solution on the nonmagnetic support.

Comparative Example II-1

A 3.5-inch floppy disc specimen was prepared in the same manner as in Example II-3 except that the magnetic particles were not oriented after the coating of the nonmagnetic layer coating solution and the magnetic layer coating solution on the nonmagnetic support.

Comparative Example II-2

A 3.5-inch floppy disc specimen was prepared in the same manner as in Example II-3 except that the dry thickness of the magnetic layer was 0.9 μm.

Comparative Example II-3

A 3.5-inch floppy disc specimen was prepared in the same manner as in Example II-4 except that the dry thickness of the magnetic layer was 1.2 μm.

EXAMPLE II-12

A 3.5-inch floppy disc specimen was prepared in the same manner as in Example II-3 except that the composition of the ferromagnetic particles to be incorporated in the magnetic layer was altered as follows:

Ferromagnetic particles
(composition ratio: Fe/Ni=98/2 (atomic ratio); coercive force: 1,200 Oe; specific surface area by BET method: 30 m$^2$/g; crystallite size: 290 Å; particle size (average length in the long axis): 0.29 μm; acicular ratio: 10; saturation magnetization σs: 121 emu/g)

EXAMPLE II-13

A 3.5-inch floppy disc specimen was prepared in the same manner as in Example II-4 except that the composition of the ferromagnetic particles to be incorporated in the magnetic layer was altered as follows:
Ferromagnetic particles
(ferromagnetic hexagonal system barium ferrite particles (i.e., tabular particles); coercive force: 1,290 Oe; specific surface area by BET method: 30 m$^2$/g;

particle size (tabular diameter): 0.2 μm; tabular ratio: 3.0; saturation magnetization σs: 50 emu/g)

Comparative Example II-4

A 3.5-inch floppy disc specimen was prepared in the same manner as in Example II-4 except that the composition of the ferromagnetic particles to be incorporated in the magnetic layer was altered as follows:
Ferromagnetic particles
Co-modified iron oxide (coercive force: 850 Oe; specific surface area by BET method: 35 m²/g; average particle size (average length in the long axis): 0.25 μm; acicular ratio: 9.0; saturation magnetization σs: 75 emu/g)

Comparative Example II-5

A 3.5-inch floppy disc specimen was prepared in the same manner as in Example II-3 except that a preparation process was used which comprises coating a nonmagnetic layer coating solution on a nonmagnetic support, drying the material to form a nonmagnetic layer thereon, winding the nonmagnetic support on a winding roll, coating a magnetic layer coating solution on the nonmagnetic layer by means of the same coating machine, and drying the material to form a magnetic layer thereon.

Comparative Example II-6

A 3.5-inch floppy disc specimen was prepared in the same manner as in Example II-4 except that a preparation process was used which comprises coating a nonmagnetic layer coating solution on a nonmagnetic support, drying the material to form a nonmagnetic layer thereon, winding the nonmagnetic support on a winding roll, coating a magnetic layer coating solution on the nonmagnetic layer by means of the same coating machine, and drying the material to form a magnetic layer thereon.

EXAMPLE II-14

A 3.5-inch floppy disc specimen was prepared in the same manner as in Example II-4 except that the magnetic particles were not oriented after the coating of the nonmagnetic layer coating solution and the magnetic layer coating solution on the nonmagnetic support.

EXAMPLE II-15

A 3.5-inch floppy disc specimen was prepared in the same manner as in Example II-4 except that the composition of the ferromagnetic particles was altered as follows:
Ferromagnetic particles
(ferromagnetic hexagonal system barium ferrite particles (i.e., tabular particles); coercive force: 1,420 Oe; specific surface area by BET method: 38 m²/g; particle size (tabular diameter): 0.05 μm; tabular ratio: 2.3; saturation magnetization as: 59 emu/g)

COMPARATIVE EXAMPLE II-7

A 3.5-inch floppy disc specimen was prepared in the same manner as in Example II-3 except that the composition of the nonmagnetic layer coating solution was free of electrically conductive particles as follows:

| Nonmagnetic Layer Coating Solution | parts by weight |
| --- | --- |
| Nonmagnetic Particles | |
| Titanium oxide (TiO₂) | 90 |
| ("TY50" produced by Ishihara Sangyo Kaisha Ltd.; average particle size: 0.34 μm; specific surface area by BET method: 5.9 m²/g; pH: 5.9) | |
| Binder resin | |
| Vinyl chloride-vinyl acetate-vinyl alcohol copolymer (content of polar group —N(CH₃)₃ + Cl—: 5 × 10⁻⁶ eq/g; monomer composition ratio: 86/13/1; polymerization degree: 400) | 14 |
| Polyester polyurethane resin (neopentyl glycol/caprolactone polyol/MDI: 0.9/2.6/1; content of —SO₃Na group: 1 × 10⁻⁴ eq/g) | 5 |
| sec-Butyl stearate | 4 |
| 2-Butoxy-1-ethyl stearate | 2 |
| 2-Butoxy-1-ethyl palmitate | 2 |
| Oleic acid | 1 |
| Methyl ethyl ketone | 200 |

Comparative Example II-8

A 3.5-inch floppy disc specimen was prepared in the same manner as in Example II-4 except that the composition of the nonmagnetic layer coating solution was altered to the same composition as used in Comparative Example II-5, which was free of electrically conductive particles.

Evaluation of Properties

The floppy disc specimens thus-obtained were measured for the following various properties:

Coercive Force and Orientation Ratio of Magnetic Layer

Using a vibrating sample magnetometer (produced by Toei Kogyo Co., Ltd.), measurements were carried out at a maximum applied magnetic field of 10 KOe. For the measurement of orientation ratio, squareness ratio was measured every 10 degrees between 0 degrees and 360 degrees along the specimen. The orientation ratio was obtained by dividing the minimum squareness ratio by the maximum squareness ratio.

Thickness of Magnetic Layer

A section was prepared from the floppy disc specimen. The section was then photographed under a scanning electron microscope ("S-700" produced by Hitachi, Ltd.). The thickness of the magnetic layer was determined from the photograph.

Surface Intrinsic Electric Resistivity (Ω/Sq) of Magnetic Layer

Using TR-8611A (digital ultrainsulation resistance meter manufactured by Takeda Riken K.K.), measurements were effected in accordance with JIS X 6101.9.4.

Reproduced Output

Using a disc tester ("SK606B" produced by Tokyo Engineering K.K.) and a metal-in-gap head having a gap length of 0.45 μm, recording was performed at a recording frequency of 625 KHz at the radial position of 24.6 mm from the center. The output reproduced by the head amplifier was measured by an oscilloscope ("7633" produced by Tektronix Ink).

The reproduced output of the specimen comprising ferromagnetic metal particles as ferromagnetic particles in the magnetic layer is represented relative to that of specimen of Example II-1 as 100, and the reproduced output of the specimen comprising hexagonal system ferrite particles as ferromagnetic particles in the magnetic layer and the specimen of Comparative Example II-4 is represented relative to that of specimen of Example II-2 as 100.

Overwritability

Using a disc tester ("SK606B" produced by Tokyo Engineering K.K.), a signal of 312.5 KHz was recorded on a specimen which had been demagnetized by an alternating magnetic field at the radial position 39.5 mm from the center. The output 01 (dB) of 312.5 KHz component was measured by means of a spectrum analyzer ("TR4171" produced by Advantest Corporation). A signal of 1 MHz was immediately overwritten on the same position. From the output 02 (dB) of 312.5 KHz component measured at the same position, the overwritability 02-01 (dB) was determined.

Modulation

The same measuring conditions and apparatus as used for reproduced output were used. From the maximum value (Vmax) and the minimum value (Vmin) of the reproduced waveform in one period, (Vmax−Vmin)/(Vmax+Vmin) was determined.

Running Durability

Using a floppy disc drive FD1331 produced by Nippon Electric Co., Ltd., recording was made on all 240 tracks on the specimen at a recording frequency of 625 KHz. A 24 hour thermal cycle test was then effected at the radial position 37.25 mm from the center in accordance with the following thermal cycle flowchart.

Under the thermal conditions, the running condition at 12 millionth pass was observed for the evaluation of running durability.

Thermal Cycle Flowchart (25° C.-50% RH; 1 hour)-→heating for 2 hours→(60° C.-20% RH; 7 hours)-→cooling for 2 hours→(25° C.-50% RH; 1 hour)→cooling for 2 hours→(5° C.-50% RH; 7 hours)→heating for 2 hours→(25° C.-50% RH; 1 hour)

Every 500,000th pass, the output of all the tracks was measured. When the output measured reached 45% or less of the initial value, it was considered to be dropout.

These 3.5-inch floppy disc specimens and the results of the evaluation of the properties thereof are set forth in Tables II-1 and II-2.

TABLE II-1

| Specimen | Nonmagnetic Layer | | Magnetic Layer | | |
|---|---|---|---|---|---|
| | Electrically Conductive Particles | Lubricant | Ferromagnetic Particles | Thickness ($\mu$m) | Orientation Ratio |
| Example II-1 | Yes | None | Ferromagnetic metal | 0.5 | 0.98 |
| Example II-2 | Yes | None | Hexagonal system ferrite | 0.5 | 0.99 |
| Example II-3 | Yes | Yes | Ferromagnetic metal | 0.5 | 0.98 |
| Example II-4 | Yes | Yes | Hexagonal system ferrite | 0.5 | 0.99 |
| Example II-5 | Yes | Yes | Ferromagnetic metal | 0.2 | 0.99 |
| Example II-6 | Yes | Yes | Hexagonal system ferrite | 0.2 | 0.99 |
| Example II-7 | Yes | Yes | Ferromagnetic metal | 0.5 | 0.98 |
| Example II-8 | Yes | Yes | Hexagonal system ferrite | 0.5 | 0.98 |
| Example II-9 | Yes | Yes | Ferromagnetic metal | 0.5 | 0.97 |
| Example II-10 | Yes | Yes | Hexagonal system ferrite | 0.5 | 0.98 |
| Example II-11 | Yes | Yes | Hexagonal system ferrite | 0.5 | 0.96 |
| Comparative Example II-1 | Yes | Yes | Ferromagnetic metal | 0.5 | 0.76 |
| Comparative Example II-2 | Yes | Yes | Ferromagnetic metal | 0.9 | 0.92 |
| Comparative Example II-3 | Yes | Yes | Hexagonal system ferrite | 1.2 | 0.98 |
| Example II-12 | Yes | Yes | Ferromagnetic metal | 0.5 | 0.90 |
| Example II-13 | Yes | Yes | Hexagonal system ferrite | 0.5 | 0.92 |
| Comparative Example II-4 | Yes | Yes | Co-modified iron oxide | 0.5 | 0.68 |
| Comparative Example II-5 | Yes | Yes | Ferromagnetic metal | 0.5 | 0.88 |
| Comparative Example II-6 | Yes | Yes | Hexagonal system ferrite | 0.5 | 0.93 |

TABLE II-1-continued

| | Nonmagnetic Layer | | Magnetic Layer | | |
| --- | --- | --- | --- | --- | --- |
| Specimen | Electrically Conductive Particles | Lubricant | Ferromagnetic Particles | Thickness (μm) | Orientation Ratio |
| Example II-14 | Yes | Yes | Hexagonal system ferrite | 0.5 | 0.95 |
| Example II-15 | Yes | Yes | Hexagonal system ferrite | 0.5 | 0.94 |
| Comparative Example II-7 | None | Yes | Ferromagnetic metal | 0.5 | 0.97 |
| Comparative Example II-8 | None | Yes | Hexagonal system ferrite | 0.5 | 0.99 |

TABLE II-2

| Specimen | Coercive Force (Oe) | Perpendicularly Diamagnetically-Corrected Squareness Ratio | Reproduced Output (%) | Running Durability | Overwritability (dB) |
| --- | --- | --- | --- | --- | --- |
| Example II-1 | 1,540 | — | 100 | No defects at 12 millionth pass | −32 |
| Example II-2 | 1,350 | 0.85 | 100 | No defects at 12 millionth pass | −30 |
| Example II-3 | 1,560 | — | 100 | No defects at 12 millionth pass | −33 |
| Example II-4 | 1,370 | 0.85 | 100 | No defects at 12 millionth pass | −30 |
| Example II-5 | 1,550 | — | 98 | No defects at 12 millionth pass | −38 |
| Example II-6 | 1,370 | 0.83 | 97 | No defects at 12 millionth pass | −40 |
| Example II-7 | 1,560 | — | 101 | No defects at 12 millionth pass | −33 |
| Example II-8 | 1,360 | 0.84 | 99 | No defects at 12 millionth pass | −32 |
| Example II-9 | 1,580 | — | 99 | No defects at 12 millionth pass | −33 |
| Example II-10 | 1,350 | 0.86 | 99 | No defects at 12 millionth pass | −31 |
| Example II-11 | 1,310 | 0.77 | 93 | No defects at 12 millionth pass | −33 |
| Comparative Example II-1 | 1,530 | — | 85 | No defects at 12 millionth pass | −30 |
| Comparative Example II-2 | 1,550 | — | 92 | No defects at 12 millionth pass | −20 |
| Comparative Example II-3 | 1,370 | 0.80 | 102 | No defects at 12 millionth pass | −18 |
| Example II-12 | 1,150 | — | 80 | No defects at 12 millionth pass | −35 |
| Example II-13 | 1,230 | 0.58 | 80 | No defects at 12 millionth pass | −21 |
| Comparative Example II-4 | 805 | 0.31 | 65 | Dropout at 4.2 millionth pass | −35 |
| Comparative Example II-5 | 1,550 | — | 97 | Dropout at 5 millionth pass | −32 |
| Comparative Example II-6 | 1,360 | 0.82 | 90 | Dropout at 4 millionth pass | −33 |
| Example II-14 | 1,360 | 0.55 | 88 | No defects at 12 millionth pass | −28 |
| Example II-15 | 1,380 | 0.50 | 83 | No defects at 12 millionth pass | −27 |
| Comparative Example II-7 | 1,560 | — | 99 | Dropout at 3 millionth pass | −33 |
| Comparative Example II-8 | 1,370 | 0.85 | 99 | Dropout at 4 millionth pass | −32 |

EXAMPLE II-16

A 3.5-inch floppy disc specimen was prepared in the same manner as in Example II-3 except that the composition of the nonmagnetic layer coating solution was altered to contain a lubricant as follows:

| Nonmagnetic Layer Coating Solution | parts by weight |
|---|---|
| Nonmagnetic Particles | |
| Titanium oxide (TiO$_2$) | 90 |
| ("TY50" produced by Ishihara Sangyo Kaisha Ltd.; average particle size: 0.34 μm; specific surface area by BET method: 5.9 m$^2$/g; pH: 5.9) | |
| Carbon black | 10 |
| (average primary particle size: 16 mμm; DBP oil absorption: 80 ml/100 g; pH: 8.0; specific surface area by MET method: 250 m$^2$/g; volatile component: 1.5% by weight) | |
| Binder resin | |
| Vinyl chloride-vinyl acetate-vinyl alcohol copolymer | 14 |
| (content of polar group —N(CH$_3$)$_3$ + Cl—: 5 × 10$^{-6}$ eq/g; monomer composition ratio: 86/13/1; polymerization degree: 400) | |
| Polyester polyurethane resin | 5 |
| (neopentyl glycol/caprolactone polyol/MDI: 0.9/2.6/1; content of —SO$_3$Na group: 1 × 10$^{-4}$ eq/g) | |
| sec-Butyl stearate | 2 |
| 2-Butoxy-1-propyl stearate | 2 |
| Methyl ethyl ketone | 200 |

EXAMPLE II-17

A 3.5-inch floppy disc specimen was prepared in the same manner as in Example II-3 except that the composition of the nonmagnetic layer coating solution was altered by changing the lubricant as follows:

| | parts by weight |
|---|---|
| sec-Butyl stearate | 9 |
| 2-Butoxy-1-propyl stearate | 9 |

EXAMPLE II-18

A 3.5-inch floppy disc specimen was prepared in the same manner as in Example II-3 except that the composition of the nonmagnetic layer coating solution was altered by changing the lubricant as follows:

| | parts by weight |
|---|---|
| Butyl stearate | 5 |

| | parts by weight |
|---|---|
| Butoxy ethyl stearate | 5 |

EXAMPLE II-19

A 3.5-inch floppy disc specimen was prepared in the same manner as in Example II-3 except that the composition of the nonmagnetic layer coating solution was altered by changing the lubricant as follows:

| | parts by weight |
|---|---|
| sec-Butyl stearate | 12 |
| 2-Butoxy-1-propyl stearate | 12 |

EXAMPLE II-20

A 3.5-inch floppy disc specimen was prepared in the same manner as in Example II-3 except that the composition of the nonmagnetic layer coating solution was altered by changing the lubricant as follows:

| | parts by weight |
|---|---|
| Oleic acid | 10 |

The results of the evaluation of the properties of Specimens II-16 to II-20 are set forth in Table 3.

TABLE 3

| Specimen | Coercive Force (Oe) | Orientation Ratio | Modulation (%) | Reproduced Output (%) | Running Durability | Overwritability (db) |
|---|---|---|---|---|---|---|
| Example II-16 | 1,560 | 0.98 | 2.1 | 101 | No defects at 12 millionth pass | −33 |
| Example II-17 | 1,555 | 0.98 | 2.4 | 100 | No defects at 12 millionth pass | −33 |
| Example II-18 | 1,560 | 0.98 | 2.3 | 100 | No defects at 12 millionth pass | −33 |
| Example II-19 | 1,560 | 0.98 | 2.3 | 99 | No defects at 12 millionth pass | −33 |
| Example II-20 | 1,550 | 0.98 | 3.0 | 96 | Dropout at 11 millionth pass | −38 |

It was thus confirmed that the incorporation of a lubricant in the nonmagnetic layer in an amount of 3 to 20% by weight provides a magnetic recording disc suitable for high density recording having an improved running durability and excellent electromagnetic properties.

EXAMPLE II-21

A 3.5-inch floppy disc specimen was prepared in the same manner as in Example II-3 except that the composition of the nonmagnetic layer coating solution was altered by changing the nonmagnetic particles as follows:

| | parts by weight |
|---|---|
| TiO$_2$ | 95 |
| Carbon black | 5 |

EXAMPLE II-22

A 3.5-inch floppy disc specimen was prepared in the same manner as in Example II-3 except that the composition of the nonmagnetic layer coating solution was altered by changing the added carbon black as follows:
Carbon black ("Ketjen Black EC600JD", produced by Lion Akzo Co., Ltd.)
Average primary particle size: 25 mμm
DBP oil absorption: 480 ml/100 g
pH: 9.5
Specific surface area by BET method: 1,300 m$^2$/g
Volatile component: 0.7%

EXAMPLE II-23

A 3.5-inch floppy disc specimen was prepared in the same manner as in Example II-3 except that the composition of the nonmagnetic layer coating solution was altered by changing the nonmagnetic particles as follows:

|  | parts by weight |
|---|---|
| TiO$_2$ | 70 |
| Carbon black | 30 |

EXAMPLE II-24

A 3.5-inch floppy disc specimen was prepared in the same manner as in Example II-3 except that the composition of the nonmagnetic layer coating solution was altered by changing the added carbon black as follows:
Carbon black ("#3250B", produced by Mitsubishi Carbon Co., Ltd)
Average primary particle size: 30 mμm
DBP oil absorption: 150 ml/100 g
pH: 6.6
Specific surface area by BET method: 250 m$^2$/g
Volatile component: 1.2%

EXAMPLE II-25

A 3.5-inch floppy disc specimen was prepared in the same manner as in Example II-3 except that the composition of the nonmagnetic layer coating solution was altered by changing the added carbon black as follows:
Carbon black ("#50", produced by Mitsubishi Carbon Co., Ltd.)
Average primary particle size: 80 mμm
DBP oil absorption: 63 ml/100 g
pH: 5.5
Specific surface area by BET method: 23 m$^2$/g
Volatile component: 1.0%

The results of the evaluation of the properties of specimens of Examples II-21 to II-25 are set forth in Table II-4.

as electrically conductive particles in the nonmagnetic layer in an amount of 3 to 20% by weight based on the total weight of nonmagnetic particles, can further reduce the surface electric resistance of the magnetic layer and provide a magnetic recording disc having improved running durability and excellent high density recording properties.

The surface intrinsic resistivity of the magnetic layer depends on the amount, particle size and oil absorption of carbon black incorporated in the nonmagnetic layer. The surface intrinsic resistivity of specimens of Examples II-21, II-22, II-23, II-24 and II-25 were $1 \times 10^8$ Ω/sq, $2 \times 10^6$ Ω/sq, $6 \times 10^5$ Ω/sq, $1 \times 10^{10}$ Ω/sq, and $3 \times 10^{11}$ Ω/sq, respectively.

The multilayered constitution of the present invention comprises a horizontally isotropically-oriented magnetic layer having a thickness as small as 0.5 μm or less, and an orientation ratio as high as 0.85 or more. Optionally, the magnetic layer may have a coercive force of 1,400 Oe or more. The present invention further comprises a nonmagnetic layer containing electrically conductive particles provided interposed between the nonmagnetic support and the magnetic layer. The present invention provides a magnetic recording disc for digital data recording which exhibits excellent overwritability and running durability, and enables recording of signals having a wavelength as short as 1.5 μm or less.

If prepared by coating the nonmagnetic layer and the magnetic layer by a wet-on-wet coating method, the magnetic recording disc of the present invention can exhibit improved running durability.

When recording and reproduction are performed using a magnetic head having a gap length (δ) of 0.5 μm or less with a magnetic recording disc of the present invention comprising a magnetic layer having a thickness of 1.25 times or less the gap length (δ), short wavelength digital data recording can be performed with excellent overwritability.

In the magnetic recording disc comprising, on a nonmagnetic support, a nonmagnetic layer mainly containing nonmagnetic particles and a binder resin and a magnetic layer mainly containing ferromagnetic particles and a binder resin formed in this order, wherein the nonmagnetic particles in the nonmagnetic layer are entirely or partially electrically conductive particles, the thickness of the magnetic layer is 0.5 μm or less, the orientation ratio of the ferromagnetic particles in the magnetic layer is 0.85 or more, and optionally, the ferromagnetic particles in the magnetic layer are ferromagnetic metal particles or hexagonal system ferrite

TABLE II-4

| Specimen | Coercive Force (Oe) | Orientation Ratio | Modulation (%) | Reproduced Output (%) | Running Durability | Overwritability (db) |
|---|---|---|---|---|---|---|
| Example II-21 | 1,560 | 0.98 | 2.4 | 100 | No defects at 12 millionth pass | −33 |
| Example II-22 | 1,570 | 0.98 | 2.3 | 100 | No defects at 12 millionth pass | −33 |
| Example II-23 | 1,550 | 0.98 | 3.8 | 95 | No defects at 12 millionth pass | −33 |
| Example II-24 | 1,560 | 0.98 | 3.0 | 96 | No defects at 12 millionth pass | −31 |
| Example II-25 | 1,560 | 0.98 | 2.3 | 95 | No defects at 12 millionth pass | −30 |

It was thus confirmed that the incorporation of carbon black having an average particle size of 40 mμm or less, and DBP oil absorption of 300 ml/100 g or more, particles, short wavelength recording can be performed with a high output and excellent overwritability and running durability. In particular, by coating a nonmagnetic layer coating solution to form a nonmagnetic coating layer, and then coating on the nonmagnetic coating layer a magnetic layer coating solution comprising ferromagnetic particles in a binder resin solution while the nonmagnetic coating layer is wet, the running durability of the magnetic recording disc can be further improved.

While the invention has been described in detail and with reference to specific embodiments thereof, it will be apparent to one skilled in the art that various changes and modifications can be made therein without departing from the spirit and scope thereof.

What is claimed is:

1. A magnetic recording disc comprising a nonmagnetic support having thereon a nonmagnetic layer mainly comprising nonmagnetic particles and a binder resin, and a magnetic layer having a coercive force of 1,400 Oe or more and mainly comprising ferromagnetic metal particles and a binder resin, in this order, wherein said nonmagnetic particles in said non magnetic layer are partially or entirely electrically conductive particles and 3 to 20% by weight of said nonmagnetic particles in said nonmagnetic layer is carbon black having an average particle size of 40 m$\mu$m or less and a DBP oil absorption of 300 ml/100 g or more, said magnetic layer has a thickness of 0.5 $\mu$m or less, said ferromagnetic metal particles in said magnetic layer have an orientation ratio of 0.85 or more, and both of said binder resin which is contained in the nonmagnetic layer and said binder resin which is contained in the magnetic layer comprise polyisocyanate.

2. The magnetic recording disc as claimed in claim 1, wherein said ferromagnetic metal particles in said magnetic layer have an acicular ratio of from 3 to 12.

3. The magnetic recording disc as claimed in claim 1, wherein said nonmagnetic layer contains an aliphatic ester in an amount of from 3 to 20% by weight based on the weight of said nonmagnetic particles.

4. A process for preparing a magnetic recording disc comprising a nonmagnetic support having thereon a nonmagnetic layer mainly comprising nonmagnetic particles and a binder resin comprising polyisocyanate and a magnetic layer having a coercive force of 1,400 Oe or more and mainly comprising ferromagnetic metal particles and a binder resin comprising polyisocyanate, in this order, which comprises the steps:

(a) coating on a nonmagnetic support a nonmagnetic layer coating solution mainly comprising nonmagnetic particles and a binder resin comprising polyisocyanate to form a nonmagnetic layer, (b) coating on the coated nonmagnetic layer a magnetic layer coating solution having ferromagnetic metal particles dispersed in a solution of binder resin comprising polyisocyanate while the coated nonmagnetic layer is wet, and then, (c) drying the coated nonmagnetic support to form a nonmagnetic layer and a magnetic layer on the nonmagnetic support in this order, wherein said nonmagnetic particles in said nonmagnetic layer are partially or entirely electrically conductive particles and 3 to 20% by weight of said nonmagnetic particles in said nonmagnetic layer is carbon black having an average particle size of 40 m$\mu$m or less and a DBP oil absorption of 300 ml/100 g or more, said magnetic layer has a thickness of 0.5 $\mu$m or less, and said ferromagnetic metal particles in said magnetic layer have an orientation ratio of 0.85 or more.

* * * * *